US011919463B1

(12) United States Patent
Medina

(10) Patent No.: US 11,919,463 B1
(45) Date of Patent: Mar. 5, 2024

(54) COMPREHENSIVE USER CONTROL SYSTEM FOR VEHICLE

(71) Applicant: In Motion Mobility LLC, Miami, FL (US)

(72) Inventor: Edwin Medina, Miami, FL (US)

(73) Assignee: In Motion Mobility LLC, Miami, FL (US)

(*) Notice: Subject to any disclaimer, the term of this patent is extended or adjusted under 35 U.S.C. 154(b) by 0 days.

(21) Appl. No.: 17/971,451

(22) Filed: Oct. 21, 2022

(51) Int. Cl.
B60R 16/037 (2006.01)
B60R 11/00 (2006.01)
(Continued)

(52) U.S. Cl.
CPC ...... *B60R 16/0373* (2013.01); *B60R 11/0235* (2013.01); *B60R 16/0231* (2013.01);
(Continued)

(58) Field of Classification Search
CPC ............. B60R 16/0373; B60R 11/0235; B60R 16/0231; B60R 2011/0003; B60W 50/14; B60W 2050/143; B60W 10/20; B60W 2420/42; B60W 2540/18; B60W 2554/00; B60W 2710/20; B60W 30/08; B60W 30/0956; B60W 30/12; B60W 10/16; B60W 10/18; B60W 10/188; B60W 10/22; B60W 2050/0008; B60W 2050/146; B60W 2420/24; B60W 2520/06; B60W 2520/10; B60W 2520/26; B60W 2520/266; B60W 2540/00; B60W 2540/21; B60W 2540/229; B60W 2540/26; B60W 2552/00; B60W 2552/20; B60W 2552/53; B60W 2554/4041; B60W 2554/80; B60W 2554/801; B60W 2556/50; B60W 2710/18; B60W 2710/202; B60W 2710/205; B60W 2710/207; B60W 30/02; B60W 30/09; B60W 30/095; B60W 30/0953;
(Continued)

(56) References Cited

U.S. PATENT DOCUMENTS

2014/0279021 A1* 9/2014 MacNeille ......... G06Q 30/0266
705/14.63
2014/0281964 A1* 9/2014 Han ..................... G06F 3/04883
715/708
(Continued)

FOREIGN PATENT DOCUMENTS

JP 2004276803 A * 10/2004 ............. B60K 35/00

*Primary Examiner* — Nga X Nguyen
(74) *Attorney, Agent, or Firm* — Foley & Lardner LLP

(57) ABSTRACT

A control system for a vehicle includes a touch screen, a Controller Area Network (CAN) microcontroller, and an embedded computer assembly (ECA). The touch screen is configured to receive a user input. The touch screen is physically mounted directly on either side of a steering wheel of the vehicle. The CAN microcontroller is configured to communicate with a CAN bus of the vehicle. The ECA includes processing circuitry configured to obtain a user input from the touch screen and provide a control signal to the CAN microcontroller and the CAN bus of the vehicle to perform a requested vehicle function according to the user input. The touch screen and the ECA are retrofit on the vehicle and the ECA is configured to intersect, suppress, modify, or reproduce communications on the CAN bus of the vehicle.

21 Claims, 18 Drawing Sheets

(51) Int. Cl.
  *B60R 11/02*     (2006.01)
  *B60R 16/023*    (2006.01)
  *B60W 50/14*     (2020.01)
  *G06F 3/01*      (2006.01)
  *G06F 3/041*     (2006.01)
  *G06F 3/16*      (2006.01)

(52) U.S. Cl.
  CPC ............ *B60W 50/14* (2013.01); *G06F 3/017* (2013.01); *G06F 3/0416* (2013.01); *G06F 3/167* (2013.01); *B60R 2011/0003* (2013.01)

(58) Field of Classification Search
  CPC ............... B60W 30/143; B60W 30/16; B60W 30/18009; B60W 40/06; B60W 50/0097; B60W 50/0098; B60W 50/12; B60W 50/16; G06F 3/017; G06F 3/0416; G06F 3/167; B60Q 3/283; B60Q 9/00; B60Q 9/008
  See application file for complete search history.

(56) References Cited

U.S. PATENT DOCUMENTS

| | | | |
|---|---|---|---|
| 2015/0153936 A1* | 6/2015 | Lim ...................... | G06F 3/0482 715/716 |
| 2015/0378596 A1* | 12/2015 | Gutentag .............. | G06F 3/1454 715/719 |
| 2016/0267722 A1* | 9/2016 | Schroeder ............. | G07C 5/008 |
| 2018/0075647 A1* | 3/2018 | Kim ........................ | G06T 19/20 |
| 2019/0070963 A1* | 3/2019 | Jang ..................... | G06F 3/0488 |

* cited by examiner

COMPREHENSIVE USER CONTROL SYSTEM FOR VEHICLE

BACKGROUND

The present disclosure relates generally to control systems. More particularly, the present disclosure relates to vehicle control systems.

SUMMARY

One implementation of the present disclosure is a control system for a vehicle, according to some embodiments. In some embodiments, the control system includes a touch screen, a function-specific programmable logic controller (PLC), and an embedded computer assembly (ECA). In some embodiments, the touch screen is configured to receive a user input. In some embodiments, the touch screen is physically mounted directly on either side of a steering wheel of the vehicle. In some embodiments, the PLC is configured to communicate with a CAN bus of the vehicle. In some embodiments, the ECA includes processing circuitry configured to obtain a user input from the touch screen and provide a control signal to the PLC and the CAN bus of the vehicle to perform a requested vehicle function according to the user input. In some embodiments, the touch screen and the ECA are retrofit on the vehicle and the ECA is configured to intersect, suppress, modify, or reproduce communications on the CAN bus of the vehicle.

In some embodiments, the touch screen is mounted on either side of the steering wheel to be accessible by an operator of the vehicle with a physical disability. In some embodiments, the touch screen includes a horizontal or vertical curvature to facilitate accessibility by the operator. In some embodiments, the touch screen is straight.

In some embodiments, the control system is a retrofit system configured to provide touch screen control for one or more vehicle functions of the vehicle that are not controlled by a touch screen. In some embodiments, the ECA is configured to control at least lighting, turn indicators, a horn, rolling operations of windows, wiper operations, air conditioning operations, parking brake activation, gear shifting, power doors, power mirrors, door locks, cruise control, and radio or infotainment of the vehicle responsive to user inputs received at the touch screen.

In some embodiments, the control system further includes a microphone configured to obtain the user input as a voice command, and a camera configured to obtain the user input as a detected gesture. In some embodiments, the control system further includes a speaker configured to provide audio feedback to the operator as the operator interacts with the control system.

In some embodiments, the control system further includes a linear actuator operably coupled with a transmission cable of the vehicle. In some embodiments, the ECA is configured to cause the linear actuator to operate to transition between different gears of the vehicle in response to a user input to transition into a different gear, the touch screen configured to display a currently selected gear of the vehicle.

In some embodiments, the ECA is further configured to wirelessly communicate with a personal computer device. In some embodiments, the personal computer device is configured to receive the user input from the operator and wirelessly transmit the user input to the processing circuitry of the ECA. In some embodiments, the control system further includes a vehicle Local Interconnect Network (LIN) controller. In some embodiments, the vehicle LIN controller is configured to intersect serial communications of a LIN bus of the vehicle to perform the requested vehicle function.

Another implementation of the present disclosure is a vehicle, according to some embodiments. In some embodiments, the vehicle includes a Controller Area Network (CAN) bus, a Local Interconnect Network (LIN) bus, and a control system for controlling functions of the vehicle. In some embodiments, the control system includes a touch screen, a CAN microcontroller, a LIN controller, and an embedded computer assembly (ECA). In some embodiments, the touch screen is configured to receive a user input. In some embodiments, the touch screen is physically mounted directly on one side of a steering wheel of the vehicle. In some embodiments, the CAN microcontroller is configured to communicate with the CAN bus of the vehicle. In some embodiments, the LIN controller is configured to communicate with the LIN bus of the vehicle. In some embodiments, the ECA includes processing circuitry configured to obtain the user input from the touch screen, and provide a control signal to the CAN bus and the LIN bus via the CAN microcontroller and the LIN controller to perform a requested vehicle function according to the user input. In some embodiments, the touch screen and the ECA are retrofit on the vehicle and the ECA is configured to intersect, suppress, modify, or reproduce communications on the CAN bus of the vehicle.

In some embodiments, the touch screen is mounted on the one side of the steering wheel to be accessible by an operator of the vehicle with a physical disability. In some embodiments, the touch screen includes a horizontal or vertical curvature to facilitate accessibility by the operator.

In some embodiments, the control system is a retrofit system configured to provide touch screen control for one or more vehicle functions of the vehicle that are not controlled by a touch screen. In some embodiments, the ECA is configured to control at least lighting, turn indicators, a horn, rolling operations of windows, wiper operations, air conditioning operations, parking brake activation, gear shifting, power doors, power mirrors, door locks, cruise control, and radio or infotainment of the vehicle responsive to user inputs received at the touch screen.

In some embodiments, the ECA further includes a microphone configured to obtain the user input as a voice command, and a camera configured to obtain the user input as a detected gesture. In some embodiments, the ECA further includes a speaker configured to provide audio feedback to the operator as the operator interacts with the control system.

In some embodiments, the control system further includes a linear actuator operably coupled with a transmission cable of the vehicle. In some embodiments, the ECA is configured to cause the linear actuator to operate to transition between different gears of the vehicle in response to a user input to transition into a different gear. In some embodiments, the touch screen is configured to display a currently selected gear of the vehicle.

In some embodiments, the ECA is further configured to wirelessly communicate with a personal computer device. In some embodiments, the personal computer device is configured to receive the user input from the operator and wirelessly transmit the user input to the processing circuitry of the ECA.

Another implementation of the present disclosure is a method for controlling operation of one or more features of a vehicle, according to some embodiments. In some embodiments, the method includes retrofitting a vehicle with a control unit comprising a touch screen display and an embedded computer assembly (ECA). In some embodiments, the ECA is configured to control communications on a Controller Area Network (CAN) bus of the vehicle. In some embodiments, the method includes obtaining, at the touch screen display, a user input to control a function of the vehicle. In some embodiments, the touch screen display is positioned on a mount next to a steering wheel of the vehicle and accessible to an operator of the vehicle with impaired fine motor skills. In some embodiments, the method includes controlling, by the ECA and communications on the CAN bus of the vehicle, a controllable element of the vehicle to perform the function of the vehicle requested by the user input.

In some embodiments, the ECA is configured to control communications on the CAN bus of the vehicle to control at least lighting, turn indicators, a horn, rolling operations of windows, wiper operations, air conditioning operations, parking brake activation, gear shifting, power doors, power mirrors, door locks, cruise control, and radio or infotainment of the vehicle responsive to user inputs received at the touch screen. In some embodiments, the method further includes receiving, via a microphone or a camera of the control unit, another user input to control the function of the vehicle, the user input comprising a spoken command or a gesture, and controlling, by the ECA and communications on the CAN bus of the vehicle, the controllable element of the vehicle to perform the function of the vehicle requested by the spoken command or the gesture. In some embodiments, the function of the vehicle includes any of the lighting, the turn indicators, the horn, the rolling operations of windows, the wiper operations, the air conditioning operations, the parking brake activation, the gear shifting, the power doors, the power mirrors, the door locks, the cruise control, or the radio or infotainment operations of the vehicle responsive to user inputs received at the touch screen.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the Figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the FIGURES, a control system may be retrofit into a vehicle. The control system can include processing circuitry to interrupt, suppress, and/or reproduce communications on one or more communications buses of the vehicle. The control system can also include a touch screen mounted directly on a side of a steering wheel of the vehicle. The control system facilitates obtaining a user input at the touch screen or according to different modalities for controlling various features of the vehicle. Advantageously, the control system facilitates ease of use for physically disabled users who may have decreased fine motor skills.

Control System
Vehicle Overview

Figure 1:
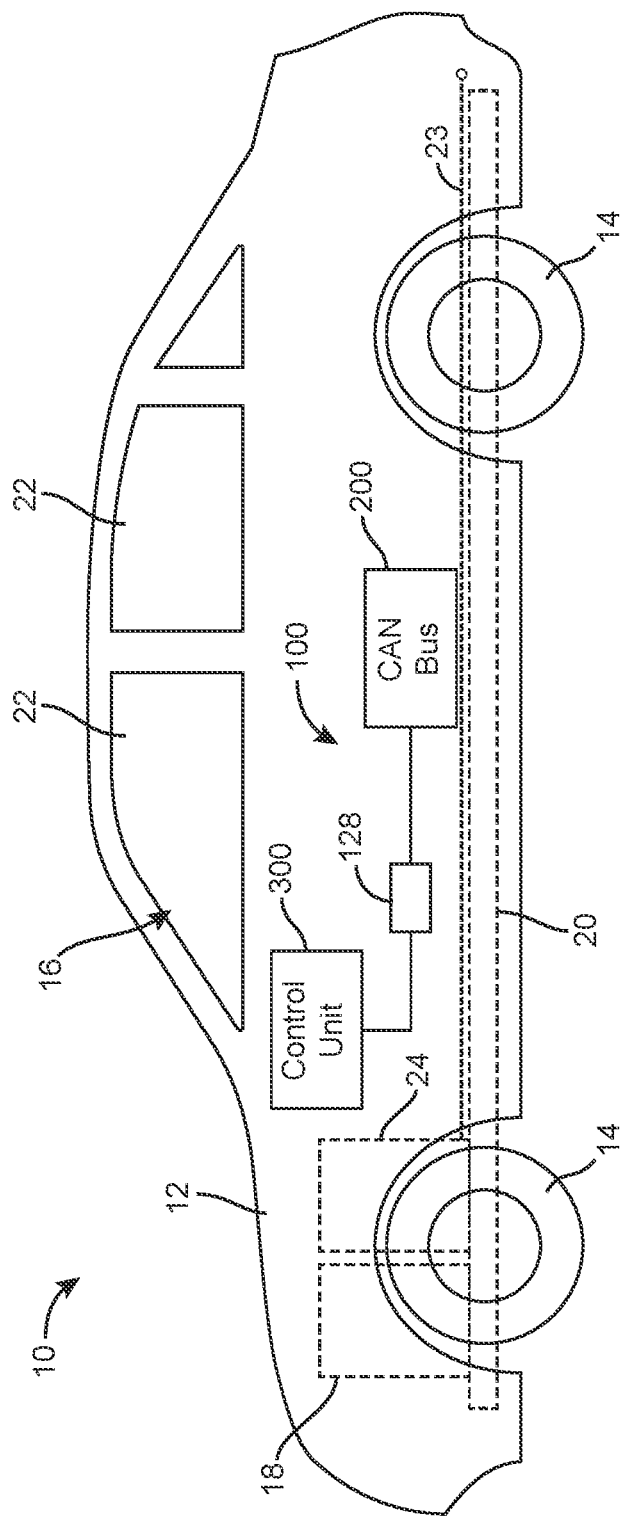
FIG. 1 is a diagram of a vehicle equipped with a retrofit control unit, according to some embodiments.

Referring to FIG. 1, a vehicle 10 (e.g., a car, a limousine, a van, an autonomous vehicle, an electric vehicle, an internal combustion engine vehicle, etc.) includes a body 12 (e.g., a frame, a shell, sidewalls, a compartment, etc.), a primary mover 18 (e.g., an internal combustion engine, an electric motor, a diesel engine, a gasoline engine, a fuel cell, etc.), and tractive elements 14 (e.g., wheels, tires, axle assemblies, wheel assemblies, etc.). The vehicle 10 also includes a chassis 20 (e.g., a frame, a carriage, etc.) configured to provide structural support for the primary mover 18 and the body 12. The body 12 defines an inner volume 16 within which an operator and a control system 100 is positioned. The vehicle 10 also includes a transmission 24 that is configured to receive or obtain mechanical energy (e.g., torque, rotational inertia, rotational energy, etc.) from the primary mover 18 and provides mechanical energy (e.g., torque, rotational inertia, rotational energy, etc.) to the tractive elements 14 of the vehicle 10. The vehicle 10 also includes a control unit 300 that is positioned within the inner volume 16 of the vehicle 10. The control unit 300 may be a unitary control unit or human machine interface (HMI) that is configured to receive user inputs from the operator according to a variety of modalities such as via a touch screen, a voice input, a gesture, etc.) and facilitate control of the vehicle 10 or various functions of the vehicle 10. The body 12 also includes one or more windows 22 (e.g., power windows) that can be rolled up or down by an electric motor. The vehicle 10 also includes a Local Interconnect Network (LIN) 142, illustrated by LIN line 23.

The control unit 300 can be a component of the control system 100 and is configured to communicate (e.g., wiredly) with a Controller Area Network (CAN) flexible data-rate (FD) microcontroller 128 of the control system 100, according to some embodiments. In some embodiments, the CAN FD microcontroller 128 is configured to communicate with a CAN bus 200 of the vehicle 10 (e.g., a CAN FD bus, a classic CAN bus, etc.) to facilitate control of various operations of the vehicle 10. The control unit 300 may be configured to facilitate control of operations of the vehicle 10 that are normally controlled by local switches (e.g., indicator switches, headlights, etc.) via a different modality of user inputs (e.g., a single touch screen, a microphone, a camera, a remote control, a personal computer device, etc.). The control unit 300 facilitates control of accessories or functions of the vehicle 10 that may be difficult for an operator with a physical disability to perform. For example, a person with a physical disability may have decreased fine motor skills resulting in difficulty extending their fingers which may make operating switches (e.g., door switches, indicator switches, etc.) difficult. Advantageously, the control unit 300 facilitates obtaining the user inputs according to different modalities (e.g., at a single touch screen, using voice commands, using a hand held remote control, using gestures, etc.) to facilitate improved control of the functions of the vehicle 10 for operators with decreased fine motor skills.

CAN Bus and Devices

Figure 2A:
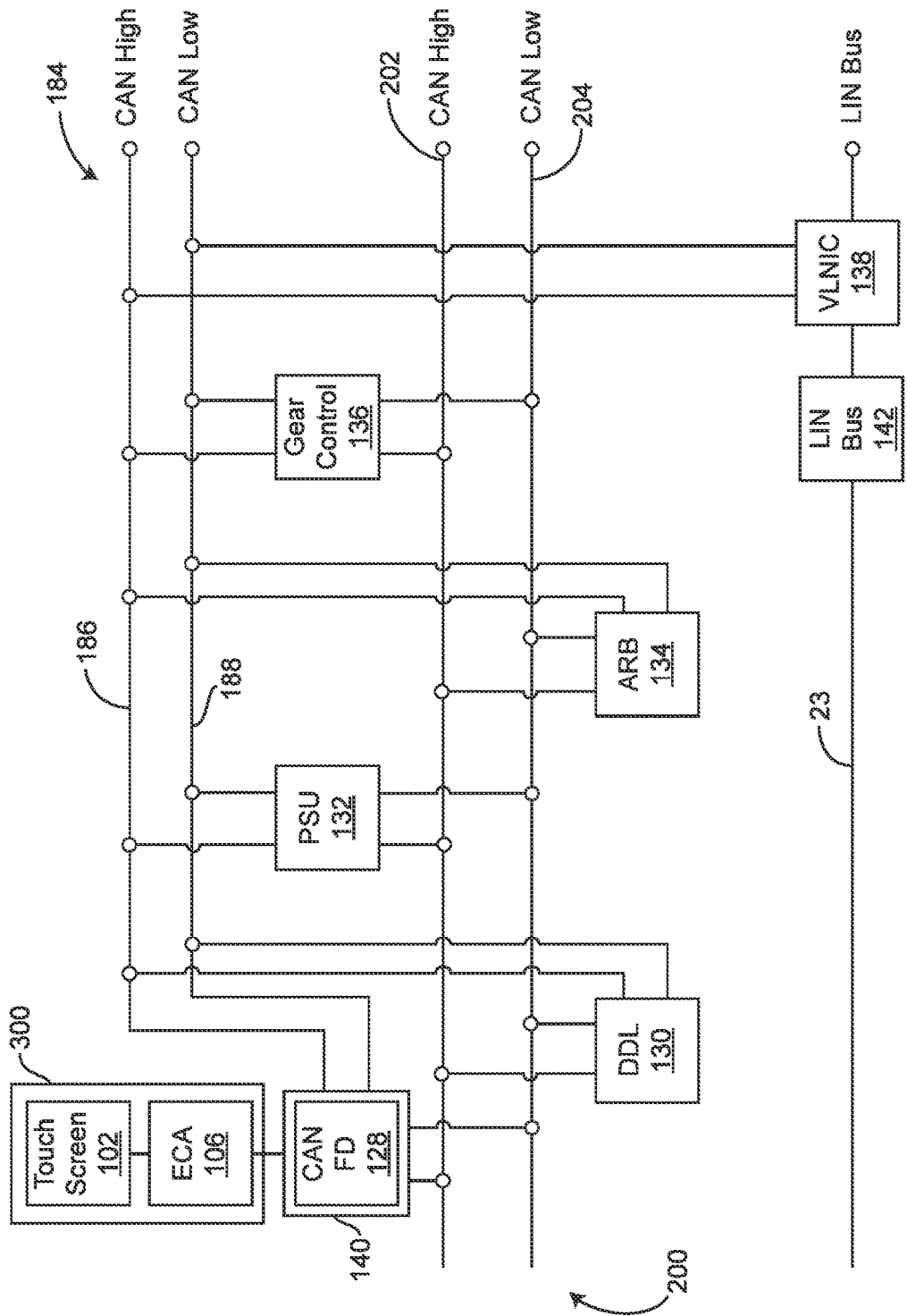
FIGS. 2A-2B are block diagrams of a Controller Area Network (CAN) and Local Interconnect Network (LIN) bus of the vehicle of FIG. 1, according to some embodiments.
Figure 2B:
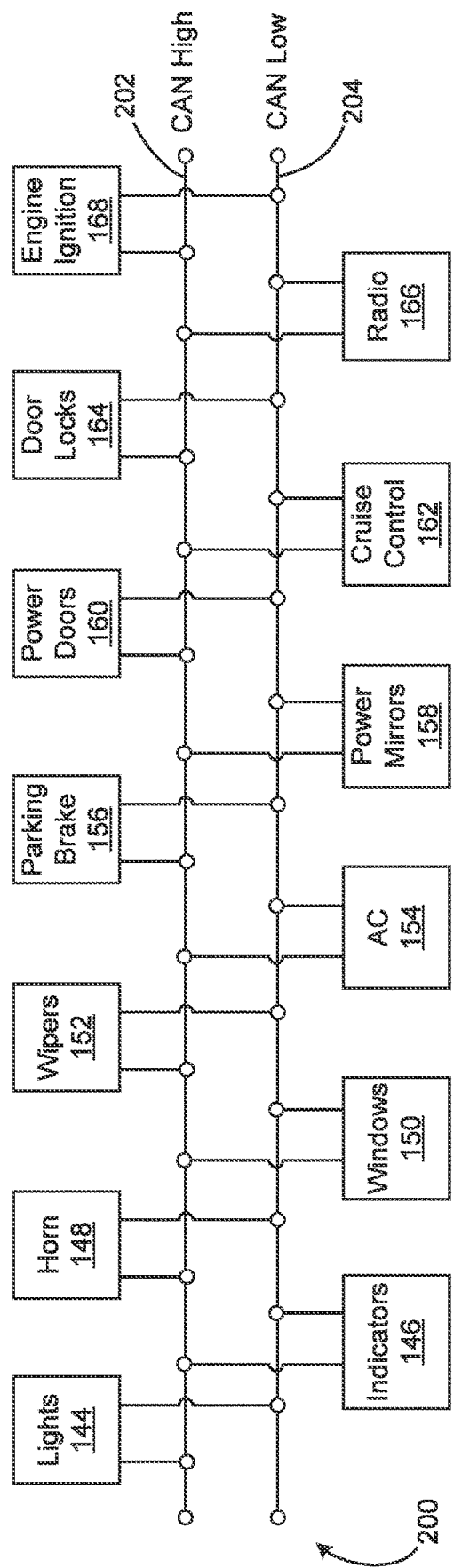

Referring to FIGS. 2A and 2B, the CAN bus 200 of the vehicle 10 is shown, according to some embodiments. The control unit 300 is communicably coupled on the CAN bus 200 through the CAN FD microcontroller 128. The CAN FD microcontroller 128 is configured to communicate on the CAN bus 200 and may interrupt, suppress, modify, or reproduce communications on the CAN bus 200 according to the control unit 300 so that the control unit 300 can control operation of one or more features, functions, accessories, etc., of the vehicle 10.

The control unit 300 includes a touch screen 102 (e.g., a capacitive touch screen, a display screen, a user input device, etc.) and an embedded computer assembly (ECA) 106, according to some embodiments. In some embodiments, the ECA 106 is configured to control operation of various peripheral devices (e.g., controllable elements), or controllers (e.g., programmable logic controllers (PLC) such as the VLNIC 138 or the VCNIC 140) that are communicably coupled with the CAN bus 200, or with a LIN bus 142. The ECA 106 communicates with the peripheral devices or controllers of the CAN bus 200 or the LIN bus 142 via the CAN FD microcontroller 128 and/or a vehicle LIN network interface controller (VLNIC) 138 (e.g., a vehicle LIN controller). The ECA 106 can, similarly to the CAN bus 200, intersect, suppress, and/or reproduce communications on the LIN bus 142 via the VLNIC 138 so that the ECA 106 can control operation of various functions, features, accessories, microcontrollers, operations, etc., of the vehicle 10 that communicate on the LIN bus 142 instead of the CAN bus 200.

In some embodiments, the VCNIC 140 is a programmable logic controller that implements or includes the CAN FD microcontroller 128. The VCNIC 140 may be communicably coupled with the ECA 106. In some embodiments, the VCNIC 140 is communicably coupled with both a CAN bus 184 and the CAN bus 200. In some embodiments, the VCNIC 140 is an electronic module that is deployed to control secondary functions of the vehicle 10 that are located on the CAN bus 200 (e.g., responsive to commands from the ECA 106).

The VLNIC 138 may be an electric module or a function specific programmable logic controller that is deployed to control secondary functions of the vehicle 10 that are located within the LIN bus 142. The VLNIC 138 may be controlled by the ECA 106 to intersect serial communications on the LIN bus 142 and reproducing, modifying, or suppressing any desired message on the LIN bus 142. In some embodiments, the VLNIC 138 includes a LIN capable microcontroller configured to bridge communications between the CAN bus 200 and/or the ECA 106 (e.g., the control unit 300) with serial network protocols that are used for communications between components of the vehicle 10. In some embodiments, the VLNIC 138 includes a clock extension peripheral interface (CXPI) chip that enables the ECA 106 or the control unit 300 to be compatible with modern automotive electronic control units (ECU) that use focused low-speed single wire network control applications such as heating, ventilation, or air-conditioning.

Referring still to FIGS. 2A and 2B, the ECA 106 is configured to communicate with and control one or more peripheral devices including a digital data logger (DDL) 130, a power supply unit (PSU) 132, an accessory relay box (ARB) 134, a gear control system 136, the VLNIC 138, and a Vehicle CAN Network Interface Controller (VCNIC) 140, according to some embodiments. In some embodiments, the VCNIC 140 is a programmable logic controller (e.g., a function-specific programmable logic controller) including the CAN FD microcontroller 128 (e.g., the CAN FD microcontroller 128 is a component of, or is implemented on, the VCNIC 140). In some embodiments, the control system 100 includes the separate CAN bus 184 (e.g., including a CAN high line 186 and a CAN low line 188) to communicate with one or more peripheral devices (e.g., the PSU 132, the DDL 130, the ARB 134, the gear control system 136, the VLNIC 138, etc.). In some embodiments, one or more of the peripheral devices are communicably coupled with both the CAN bus 184 and the CAN bus 200. For example, the ECA 106 may communicate with the peripheral devices (e.g., the DDL 130, the PSU 132, the ARB 134, the gear control system 136, etc.) which in turn communicate with other devices on the CAN bus 200.

The ECA 106 may function as a central processing unit that hosts the functionality of the control system 100 and connects and controls all peripheral devices (e.g., the DDL 130, the CAN FD microcontroller 128, the PSU 132, the ARB 134, the gear control system 136, the VLNIC 138, the VCNIC 140, etc.). The ECA 106 may use inputs from the touch screen 102 or the other modalities described herein to control the peripheral devices, or to control functionality of the vehicle 10 as described herein. The ECA 106 may be communicably coupled with the peripheral devices described herein via the CAN bus 200, or may be directly communicably coupled with the peripheral devices (e.g., wiredly or wirelessly).

The DDL 130 is a module or device (e.g., circuit, processing circuitry, controller, processor, microcontroller, etc.) that is configured to measure and record information communicated on the CAN bus 200 during different periods, according to some embodiments. In some embodiments, the DDL 130 reports any of the measured or recorded information to the ECA 106 (e.g., via the CAN bus 200) so that the ECA 106 can store and upload the recorded information. The DDL 130 can provide information that is comprehensive of conditions being monitored. The DDL 130 can include a real time clock (RTTC), a secure digital (SD) card, and a battery (e.g., an energy storage device). The DDL 130 may provide the recorded information to the ECA 106 for analysis, diagnostics, and/or improvement of the control system 100.

The PSU 132 is a module or unit (e.g., an electrical device) that is configured to supply and manage electrical consumption of the control system 100, or more generally, the vehicle 10, according to some embodiments. In some embodiments, the PSU 132 is configured to monitor internal serial communication activity of the vehicle 10 to activate elements of the vehicle 10 (e.g., controllers, peripheral devices, features, functionality, etc.) when the vehicle 10 is awake, or to deactivate the elements of the vehicle 10 when the vehicle 10 is dormant (e.g., in order to conserve power consumption of the elements, systems, sub-systems, modules, controllers, etc., of the vehicle 10). The PSU 132 may include a Zigbee chip or module in addition to or in place a Zigbee chip or module of the ECA 106. In some embodiments, the PSU 132 is configured to communicate with the ECA 106 or a personal computer device via Zigbee. For example, the ECA 106 can coordinate control of the PSU 132 or obtain analytics (e.g., monitored data) from the PSU 132.

The ARB 134 may be configured to control various systems, sub-systems, features, controls, operations, etc., of the vehicle 10 that require an analog input, according to some embodiments. In some embodiments, the ARB 134 works in combination with the VLNIC 138 and the VCNIC 140 so that analog elements, elements on the CAN bus 200, and elements on the LIN bus 142 can be controlled.

Referring to FIGS. 2A-2B, and 12-13, the gear control system 136 is configured to receive communications or controls via the CAN bus 200 (e.g., controlled by the ECA 106) and transition the transmission 24 between different gears according to the received communications. In some embodiments, the gear control system 136 includes an electronic controller 1202, a stepper motor 1204 (e.g., an electric motor), optical sensors 1208, a linear actuator 1206 (e.g., a linear guide stage actuator), and one or more brackets 1216 to mount the linear actuator 1206. The gear control system 136 may convert a vehicle with a manual gear selector lever (e.g., a shifter) into an electronic gear control system. The controller 1202 can receive communications from the ECA 106 via the CAN bus 200 (e.g., a command to transition the transmission 24 between different gears such as park, reverse, neutral, drive, etc.). In response to receiving communications from the ECA 106 to change the gear of the transmission 24, the controller 1202 generates control signal for the stepper motor 1204 and operates the stepper motor 1204 to drive an output driveshaft 1210. The output driveshaft 1210 (e.g., a shaft) is rotatably coupled with a screw 1212 (e.g., a rotatable drive member) of the linear actuator 1206 so that when the stepper motor 1204 is operated, the screw 1212 of the linear actuator 1206 is driven to translate a follower 1218 (e.g., a block) that slidably couples with a track. The linear actuator 1206 is coupled with a shifting cable 1214 of the transmission 24 and can be adjusted (e.g., translated) by the stepper motor 1204, the linear actuator 1206 and the controller 1202 responsive to control commands from the ECA 106 to thereby transition the transmission 24 between different gears.

In some embodiments, the transmission 24 is communicably coupled on the CAN bus 200 and can provide feedback such as a message indicating selected gear to the CAN bus 200 (e.g., to the ECA 106). In some embodiments, the transmission 24 is communicably coupled with the ECA 106 via the CAN bus 200 and/or the LIN bus 142. The ECA 106 and/or the controller 1202 of the gear control system 136 can be configured to use the feedback from the transmission 24 to identify which gear is currently selected, and to start or stop operation of the stepper motor 1204 to transition the transmission 24 into a desired gear.

In some embodiments, the optical sensor(s) 1208 are configured to measure the position of the cable 1214 or the linear actuator 1206 and provide sensor feedback to the controller 1202. In some embodiments, the controller 1202 uses the sensor feedback provided by the optical sensor(s) 1208 to monitor a currently selected gear of the transmission 24 and to determine when the stepper motor 1204 should be started or stopped to transition the transmission 24 into a desired gear. The controller 1202 may provide voltage to the stepper motor 1204 until the controller 1202 obtains feedback from the transmission 24 or the optical sensor(s) 1208 indicating that the transmission 24 is transitioned into the desired gear. In some embodiments, the optical sensors 1208 are configured to measure a distance between a fixed location on the bracket 1216 or on the linear actuator 1206 and the follower 1218.

Figure 12:
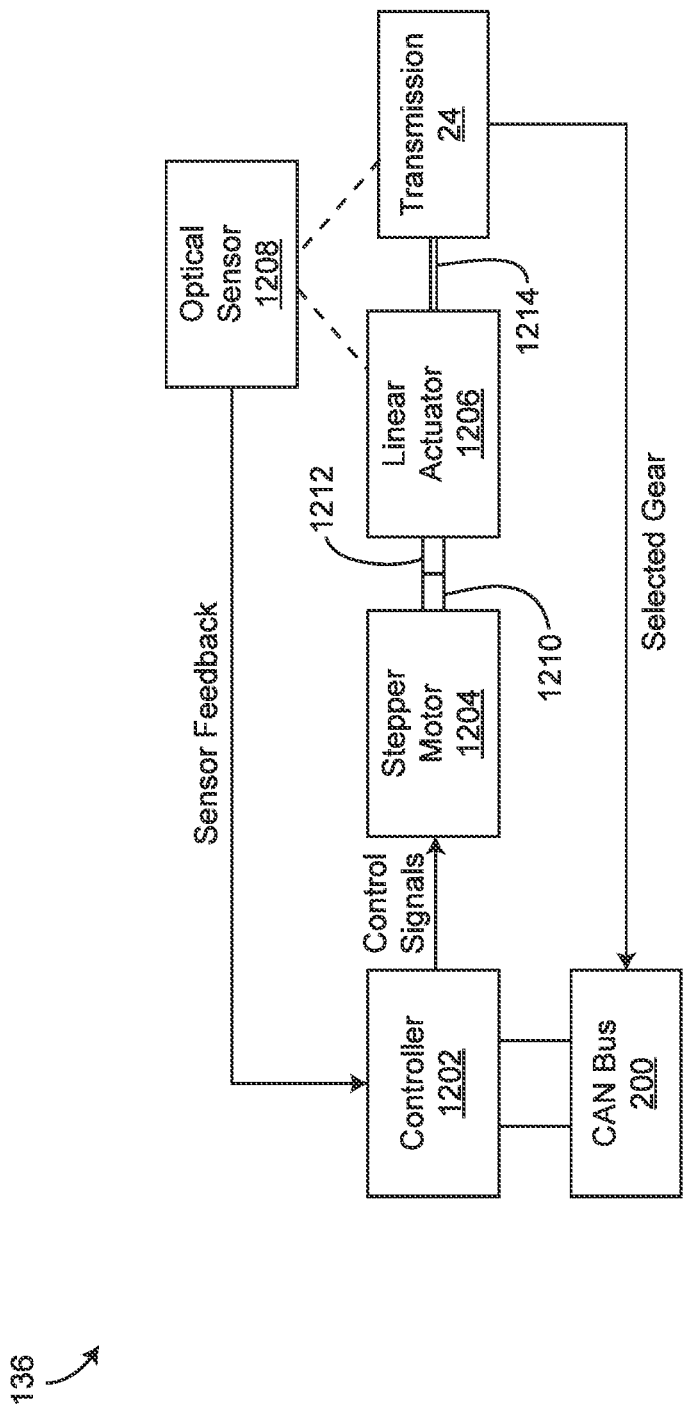
FIG. 12 is a block diagram of a gear shifting system, according to some embodiments.
Figure 13:
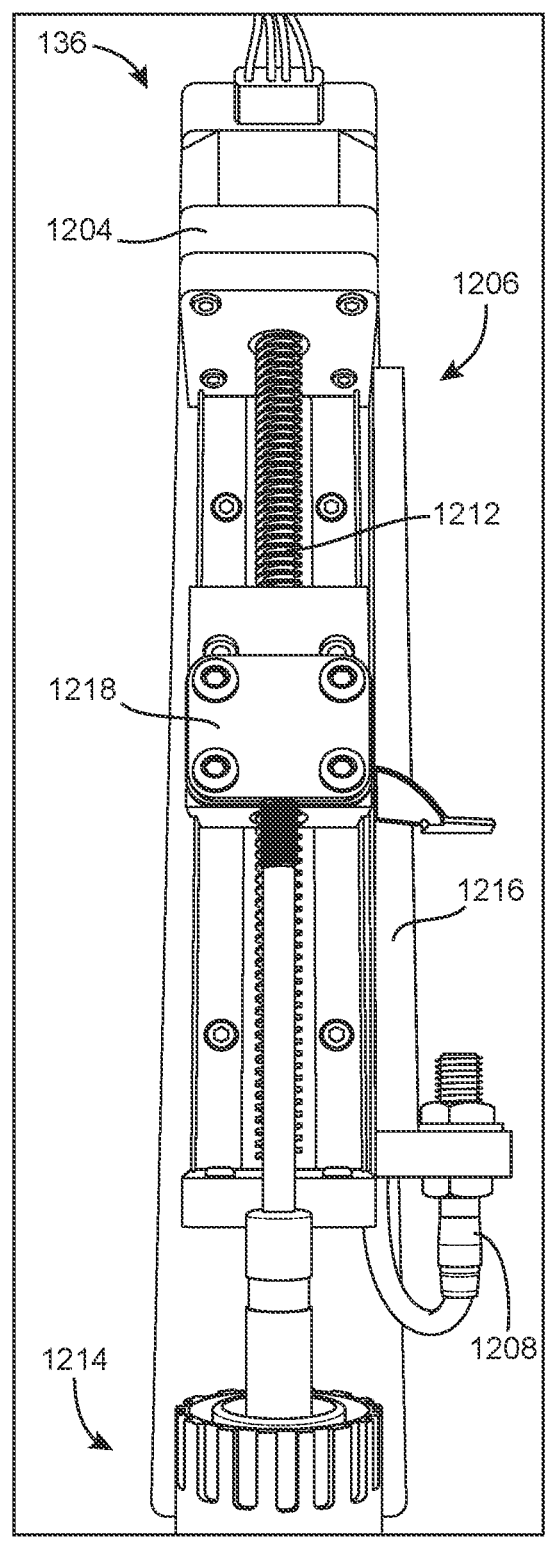
FIG. 13 is a view of the gear shifting system of FIG. 12, according to some embodiments.

Referring still to FIGS. 2A, 2B, and 12, the gear control system 136 may be retrofit into the vehicle 10 so that the operator of the vehicle 10 can transition the transmission 24 between the different gears using the control unit 300 (e.g., without manually or physically moving a lever). The stepper motor 1204, the linear actuator 1206, the optical sensor(s) 1208, brackets 1216, etc., can be physical installed on the vehicle 10 (e.g., coupled with the shifting cable 1214) with the controller 1202 communicably coupled on the CAN bus 200 (or the LIN bus 142) so that the operator can control or shift gears (e.g., of the transmission 24) by providing a user input at the control unit 300, without requiring the operator to physically move a shifter lever.

Referring to FIGS. 2A and 2B, the CAN bus 200 includes multiple devices communicably coupled on the CAN high 202 and the CAN low 204, according to some embodiments. Specifically, lights 144 (e.g., headlights, dome lights, lighting circuits, etc.), indicators 146 (e.g., turn indicators, hazard flashers, etc.), a horn 148, power windows 150, wipers 152, air conditioning (AC) 154, a parking brake 156, power mirrors 158, power doors 160, cruise control 162, door locks 164, and a radio 166 (e.g., an infotainment system). It should be understood that any of the devices shown in FIG. 2B that are communicably coupled on the CAN bus 200 may also be communicably coupled on the LIN bus 142. In some embodiments, any of the devices shown in FIG. 2B that are communicably coupled on the CAN bus 200 include controllers or electric motors that are communicably coupled on the CAN bus 200 (or on the LIN bus 142, depending on the configuration of the vehicle 10) which may be controlled by the ECA 106 (e.g., by interrupting, suppressing, modifying, and/or reproducing communications on the CAN bus 200 and/or the LIN bus 142 through operation of the VCNIC 140 (e.g., the CAN FD microcontroller 128), and/or the VLNIC 138) responsive to a user input at the control unit 300.

In this way, the ECA 106 may control operation of:

lighting functionality of the vehicle 10 (e.g., dome lights, interior lights, headlights, etc.) by providing communications to the lights 144 (e.g., to the controllers thereof);

indicator functionality of the vehicle 10 (e.g., turn indicators, left turn indicators, right turn indicators, hazard flashers, etc.) by providing communications to the indicators 146 (e.g., to the controllers thereof);

horn functionality of the vehicle 10 (e.g., a siren, an aural alert device, etc.) by providing communications to the horn 148 (e.g., to the controller thereof);

power window functionality of the vehicle 10 (e.g., front windows, rear windows, sunroof windows, moonroof windows, etc.) by providing communications to the windows 150 (e.g., to the controllers or electric motors thereof);

wiper functionality of the vehicle 10 (e.g., windshield wipers, windshield wiper washer functionality, rear wipers, rear wiper washer functionality, etc.) by providing communications to the wipers 152 (e.g., to the controllers or wiper motors);

AC functionality of the vehicle 10 (e.g., activating the AC, deactivating the AC, adjusting a temperature setpoint, etc.) by providing communications to the AC 154 (e.g., to a controller or electric clutch of the AC of the vehicle 10);

parking brake functionality of the vehicle 10 (e.g., activating or deactivating a parking brake of the vehicle 10) by providing communications to the parking brake 156 (e.g., to a controller or electric motor of the parking brake);

power mirror adjustment functionality (e.g., adjusting an orientation of side or rearview mirrors of the vehicle 10) by providing communications to the power mirrors 158 (e.g., to a controller or power mirror motor);

power door adjustment (e.g., actuating a door between an open position and a closed position, deploying or retracting a wheelchair or disabled occupant system, operating a release mechanism of a wheelchair securement system, etc.) by providing communications to the power doors 160 (e.g., to a controller or one or more door motors);

cruise control adjustment (e.g., increasing or decreasing a speed setpoint, activating or deactivating cruise control, pausing cruise control, cancelling cruise control, setting a speed setpoint, etc.) by providing communications to the cruise control 162 (e.g., to a controller of the cruise control 162);

door lock adjustment (e.g., actuating the door locks between a locked state and an unlocked state) by providing communications to the door locks 164 (e.g., to a door lock motor or actuator or controller);

radio or infotainment adjustment (e.g., changing a source, adjusting volume, changing a radio channel, etc.) by providing communications to the radio 166 of the vehicle 10;

engine or electric motor starting or stopping (e.g., performing a starting operation or shutting off the primary mover 18) by providing communications to an engine ignition controller 168 (e.g., an ignition coil, a battery, etc.); and/or gear selection or adjustment of the transmission 24 of the vehicle 10.

Control Unit

Figure 3:
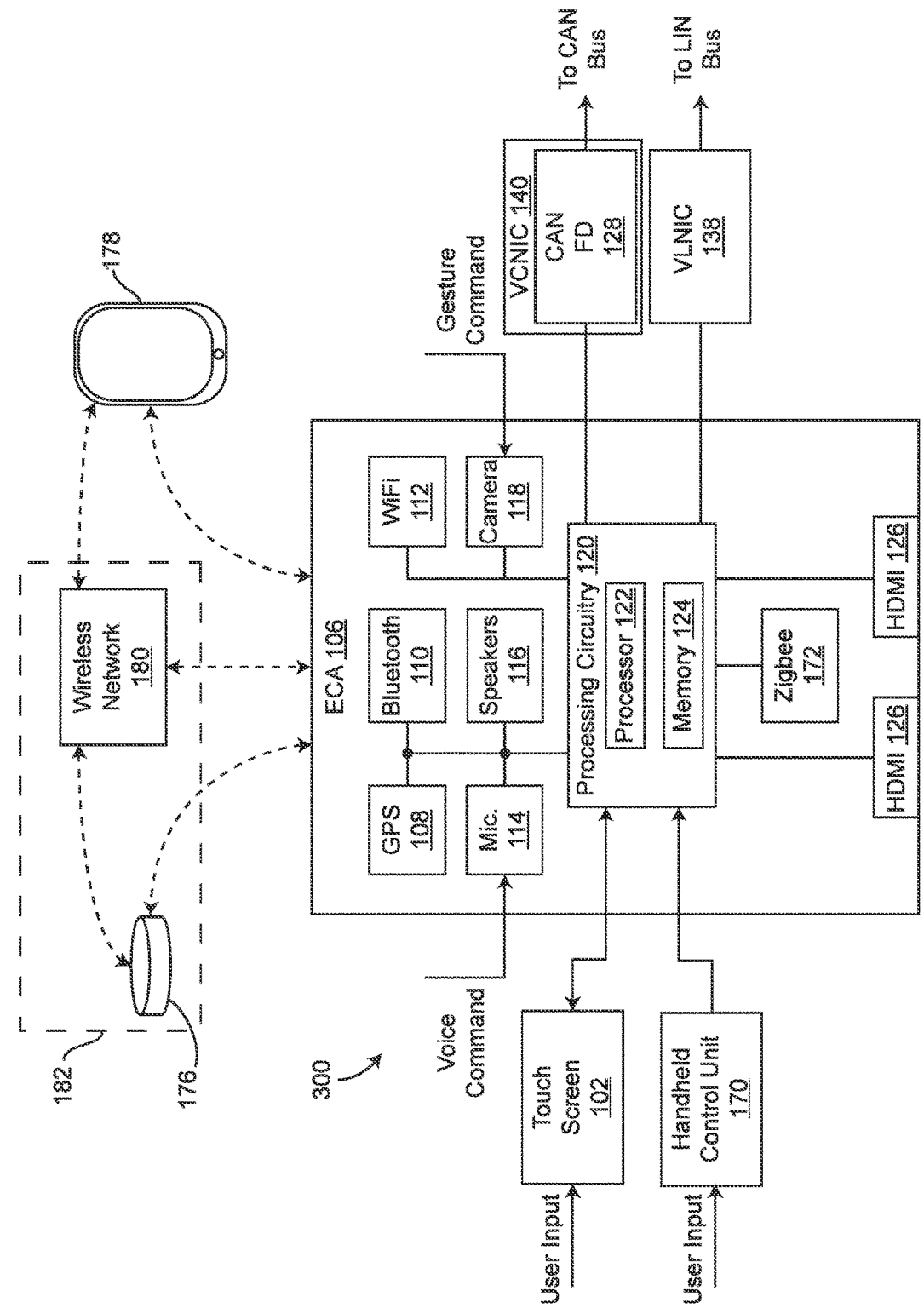
FIG. 3 is a block diagram of the control unit of FIG. 1, according to some embodiments.

Referring to FIG. 3, the control unit 300 includes the ECA 106, the touch screen 102, a handheld control unit 170, and the VCNIC 140 (e.g., that implements or includes the CAN FD microcontroller 128), according to some embodiments. In some embodiments, the control unit 300 is configured to receive a user input according to different modalities or from different input devices. The ECA 106 can send communications on the CAN bus 200 and/or the LIN bus 142 (e.g., by interrupting, suppressing, modifying, and/or reproducing communications on the CAN bus 200 and/or the LIN bus 142 via the CAN FD microcontroller 128, the VCNIC 140, and/or the VLNIC 138) to control different vehicle functionality responsive to the user inputs. Advantageously, the control unit 300 facilitates control of features or operations of the vehicle at a single control point (e.g., the touch screen 102, a spoken command, etc.), according to a modality different than the controls of the vehicle 10 (e.g., via the touch screen 102 instead of at a physical switch in the vehicle 10), or using a different device (e.g., a personal computer device, a smartphone, a home management device, a remote control, etc.).

Referring still to FIG. 3, the ECA 106 includes processing circuitry 120 including a processor 122 and memory 124. Processing circuitry 120 can be communicably connected to a communications interface such that processing circuitry 120 and the various components thereof can send and receive data via the communications interface. Processor 122 can be implemented as a general purpose processor, an application specific integrated circuit (ASIC), one or more field programmable gate arrays (FPGAs), a group of processing components, or other suitable electronic processing components.

Memory 124 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 124 can be or include volatile memory or non-volatile memory. Memory 124 can include database components, object code components, script components, or any other type of information structure for supporting the various activities and information structures described in the present application. According to some embodiments, memory 124 is communicably connected to processor 122 via processing circuitry 120 and includes computer code for executing (e.g., by processing circuitry 120 and/or processor 122) one or more processes described herein.

It should be understood that any operations of the ECA 106 as described herein may be performed by the processing circuitry 120. For example, when the ECA 106 is described as controlling communications on the CAN bus 200, the processing circuitry 120 may operate to control communications on the CAN bus 200.

The ECA 106 may receive one or more user inputs from an operator, user, or driver of the vehicle 10 via the touch screen 102. The ECA 106 can be configured to operate the touch screen 102 to provide a GUI to the user. The user may select different screens, press different buttons, etc., and otherwise navigate on the touch screen 102 to provide the user inputs. Responsive to receiving the user input (e.g., a request to activate, deactivate, adjust, etc., one or more of the functions described in greater detail above with reference to FIGS. 2A-2B and 12-13), the ECA 106 provides controls or commands to corresponding microcontrollers, controllers, electric motors, etc., to perform the requested function(s) by interrupting, suppressing, and/or reproducing communications on the CAN bus 200 or the LIN bus 142 (e.g., by operating the CAN FD microcontroller 128 of the VCNIC 140, and/or the VLNIC 138).

The ECA 106 is also configured to obtain one or more user inputs from the handheld control unit 170, according to some embodiments. In some embodiments, the handheld control unit 170 is a wireless remote that is configured to communicate with the ECA 106 via one or more wireless transceivers of the wireless remote and the ECA 106. In some embodiments, the handheld control unit 170 is wiredly coupled with the processing circuitry 120 of the ECA 106. In some embodiments, the handheld control unit 170 is positioned within the vehicle 10 (e.g., within reach of the operator of the vehicle 10) so that the operator can use the handheld control unit 170 to provide the user input. In some embodiments, operation of the handheld control unit 170 (e.g., depression of buttons, toggling of switches, etc.) is used by the processing circuitry 120 to operate the touch screen 102 between different GUIs. The operator may use the handheld control unit 170 to navigate through the different GUIs of the touch screen 102, and select an operation of the vehicle 10 to be updated, activated, de-activated, adjusted, etc. (e.g., any of the operations, functions, features, etc., of the vehicle 10 as described in greater detail above with reference to FIGS. 2A, 2B, and 12).

In some embodiments, the ECA 106 includes a camera 118 that is configured to provide image data to processing circuitry 120 of the ECA 106. The processing circuitry 120 may be configured to use the image data from the camera 118 (e.g., in combination with image analysis techniques, facial recognition technology, gesture detection, etc.) to identify when a user input has been provided by the operator or user of the vehicle 10 (e.g., a gesture, a spoken phrase, etc.), shown as gesture command. The user input can be provided as the gesture command and the processing ECA 106 (e.g., the processing circuitry 120) can use the gesture command to control a corresponding function of the vehicle 10 (e.g., any of the features, functions, or operations described in greater detail above with reference to FIGS. 2A, 2B, and 12) such as changing a gear of the transmission 24 of the vehicle 10. In some embodiments, the gesture command obtained from the camera 118 is used to navigate the touch screen 102 (e.g., to swipe between different screens or GUIs, select a specific button of the touch screen 102, etc.). In some embodiments, the facial recognition obtained by the camera 118 is also used for security to confirm that the current operator of the vehicle 10 is the owner of the vehicle 10 or an approved user. If the operator in the vehicle 10 is not an approved user or is not the owner of the vehicle 10, the ECA 106 may prevent starting of the vehicle 10.

The ECA 106 also includes a microphone 114 (e.g., an aural input device) that is configured to receive an aural input (e.g., a spoken input, speech of a user or operator, a spoken word or phrase, etc.), shown as voice command, according to some embodiments. In some embodiments, the voice command is a command to activate a specific feature (e.g., "Turn on front windshield wipers," "Lock the doors," "Set the cruise control," "Turn on high-beams," etc.) of the vehicle 10. The microphone 114 can provide sound data or audio data to the processing circuitry 120 which may perform a speech recognition technique (e.g., a transcription technique, etc.) to identify spoken words or phrases (e.g., requests to operate a certain function of the vehicle 10). In some embodiments, the voice command is a command to activate, de-activate, adjust, operate, etc., a specific function of the vehicle 10 (e.g., an accessory function, a driving operation, etc.). In some embodiments, the voice command is a command to navigate through various screens or GUIs of the touch screen 102 (e.g., spoken phrases such as "Next screen," "Go to home screen," etc.).

As described herein, the ECA 106 can receive user inputs according to different modalities as described herein. The ECA 106 can receive user inputs according to a spoken modality (via microphone 114), user inputs according to a gesture modality (via camera 118), user inputs according to a tactile modality (e.g., via the touch screen 102 or via the handheld control units 170). The user inputs described herein (e.g., according to any of the modalities) may be direct requests or commands to control operation of a feature of the vehicle 10 as described in greater detail above with reference to FIGS. 2A-2B, and 12. In some embodiments, the user inputs described herein (e.g., according to any of the modalities) are used to navigate through different screens or GUIs of the touch screen 102 which informs the operator regarding potential control options.

In some embodiments, the ECA 106 includes a global positioning system (GPS) module 108, a Bluetooth module 110, a WiFi module 112, and/or a Zigbee module 172. The GPS module 108 as shown in FIG. 3 may represent two independent GPS modules of the ECA 106 for improved accuracy and redundancy. The ECA 106 may include a mini Peripheral Component Interconnect Express (PCIe) port or connection through which a General Packet Radio Service (GPRS) 4G modem can be connected with the ECA 106 to facilitate 4G communications (e.g., communications on a 4G cellular network). The GPRS 4G modem may facilitate or enable high transfer rates of information at high speeds in order to update, sense, or diagnose the control system 100 over the air. In some embodiments, the GPRS 4G modem can connect the ECA 106 on a wireless network so that a remote system can monitor any communications or operations of the ECA 106. In some embodiments, data obtained by the DDL 130 is communicated to the remote system via the GPRS 4G modem for analysis.

The Bluetooth module 110 is configured to facilitate or enable communications between the ECA 106 and Bluetooth communicable devices such as a user device 178 (e.g., a smartphone, an Android phone, an iPhone, etc.), a home device 176, etc., according to some embodiments. In some embodiments, the Bluetooth module 110 is configured to obtain user inputs from the user device 178 (e.g., to perform any of the functions as described in greater detail above with reference to FIGS. 2A-2B and 12). In some embodiments, the user device 178 includes a mobile application which configures the user device 178 to communicate with the ECA 106, and to provide any of the GUIs of the touch screen 102 on a display screen or touch screen of the user device 178. In some embodiments, the ECA 106 is configured to establish communication with the user device 178 via the Zigbee module 172 or the WiFi module 112. In some embodiments, Zigbee module 172 is configured to communicably couple the ECA 106 with any Zigbee communicable devices, and the WiFi module 112 is configured to communicably couple the ECA 106 with any of a WiFi device, a WiFi network, etc.

The WiFi module 112 may also configure the ECA 106 to communicate with a WiFi network, shown as wireless network 180. In some embodiments, the wireless network 180 is a WiFi network of a home 182 (e.g., where the operator of the vehicle 10 lives). In some embodiments, when the vehicle 10 is within proximity of the wireless network 180 (e.g., in a driveway, in a garage of the home 182, etc.) the ECA 106 is configured to communicably couple on the wireless network 180 via the WiFi module 112. The wireless network 180 facilitates communicably coupling other devices on the wireless network 180 with the ECA 106, according to some embodiments. In some embodiments, the ECA 106 is communicably coupled with the home device 176 via the wireless network 180 (or directly via any of the Bluetooth module 110, the WiFi module 112, the Zigbee module 172, etc.). The ECA 106 can therefore communicate with the home device 176 to provide notifications or updates to the operator of the vehicle 10 via the home device 176 (e.g., when the operator is in the home 182), or to receive commands or user inputs from the home device 176 when the operator is in the house (e.g., receiving a command from the operator via the home device 176, the wireless network 180, and the WiFi module 112 such as "Start the car," or "Unlock the car" or "Open the passenger door of my car," etc.). In some embodiments, the PSU 132 is equipped with the Zigbee module 172 in addition to or in place of the ECA 106. The ECA 106 or the PSU 132 may detect low battery charge of the vehicle 10, and may send a message to any of the touch screen 102, the user device 178, the home device 176, etc., to notify the owner of the vehicle 10 regarding the low battery charge and that the vehicle 10 should be started. In some embodiments, the Zigbee module 172 is used for high-level communications protocols to communicably couple the ECA 106 with other Zigbee-enabled devices on a personal network (e.g., a home automation network). Advantageously, the Zigbee connection enables the user to receive messages or alerts and transmit commands to manage the home-connected devices and the vehicle 10.

For example, the ECA 106 may send an alert to the user when the user is in their home 182 responsive to low battery levels as detected by the PSU 132. The alert may include a visual message or a spoken message such as "The started battery charge of your vehicle is critical—please drive the vehicle for 30 to 60 minutes or connect a battery charger" which may be provided via the mobile application of the user device 178, on a webpage that the user can access, or aurally via the home device 176. Conversely, the user may send a command to the ECA 106 to start the primary mover 18 of the vehicle 10 and adjust temperatures of the inner volume 16 by speaking to the home device 176, starting the vehicle 10 from the user device 178, etc.

Referring still to FIG. 3, the ECA 106 includes one or more speakers 116 that are controlled by the processing circuitry 120 of the ECA 106, according to some embodiments. In some embodiments, the speakers 116 are configured to provide audio feedback to the user or the operator of the vehicle 10 as the operator or user of the vehicle 10 operates the touch screen 102 or while the user or operator is otherwise interacting with the control system 100. For example, the ECA 106 (e.g., the processing circuitry 120) can control the speakers 116 when the operator or user touches a button (e.g., a digital accessibility button (DAB)) on the touch screen 102 to recite a list of programmed commands. The user may touch the DAB button again once the user hears the desired command in order to activate the corresponding feature of the vehicle 10. The ECA 106 operates the controllers, electric motors, etc., of the vehicle 10 according to the desired command.

The ECA 106 also includes a pair of High-Definition Multimedia Interface (HDMI) ports 126, according to some embodiments. In some embodiments, the HDMI ports 126 facilitate external communicability so that the ECA 106 can be connected to a computer device, information can be downloaded from the ECA 106, the ECA 106 can be programmed, etc.

Touch Screen or Mobile Application GUIs

Referring to FIGS. 5-11, various GUIs for controlling one or more operations of functions of the vehicle 10 are shown, according to some embodiments. The GUIs shown in FIGS. 5-11 may be displayed on the touch screen 102 of the control unit 300, or may be displayed on a screen of the user device unit 178 that is configured with a mobile application. Selection of various functions results in a user input to perform that function being provided to the ECA 106 which causes the corresponding controller, electrical system, components, electric motors, etc., of the vehicle 10 to perform the requested function. Any of the functions shown in the GUIs herein with reference to FIGS. 5-11 represent controllable elements, systems, or features of the vehicle 10 that include corresponding modules, controllers, motors, electrical systems, batteries, etc., communicably coupled on the CAN bus 200 and/or the LIN bus 142 and may be operated by the ECA 106.

Figure 5:
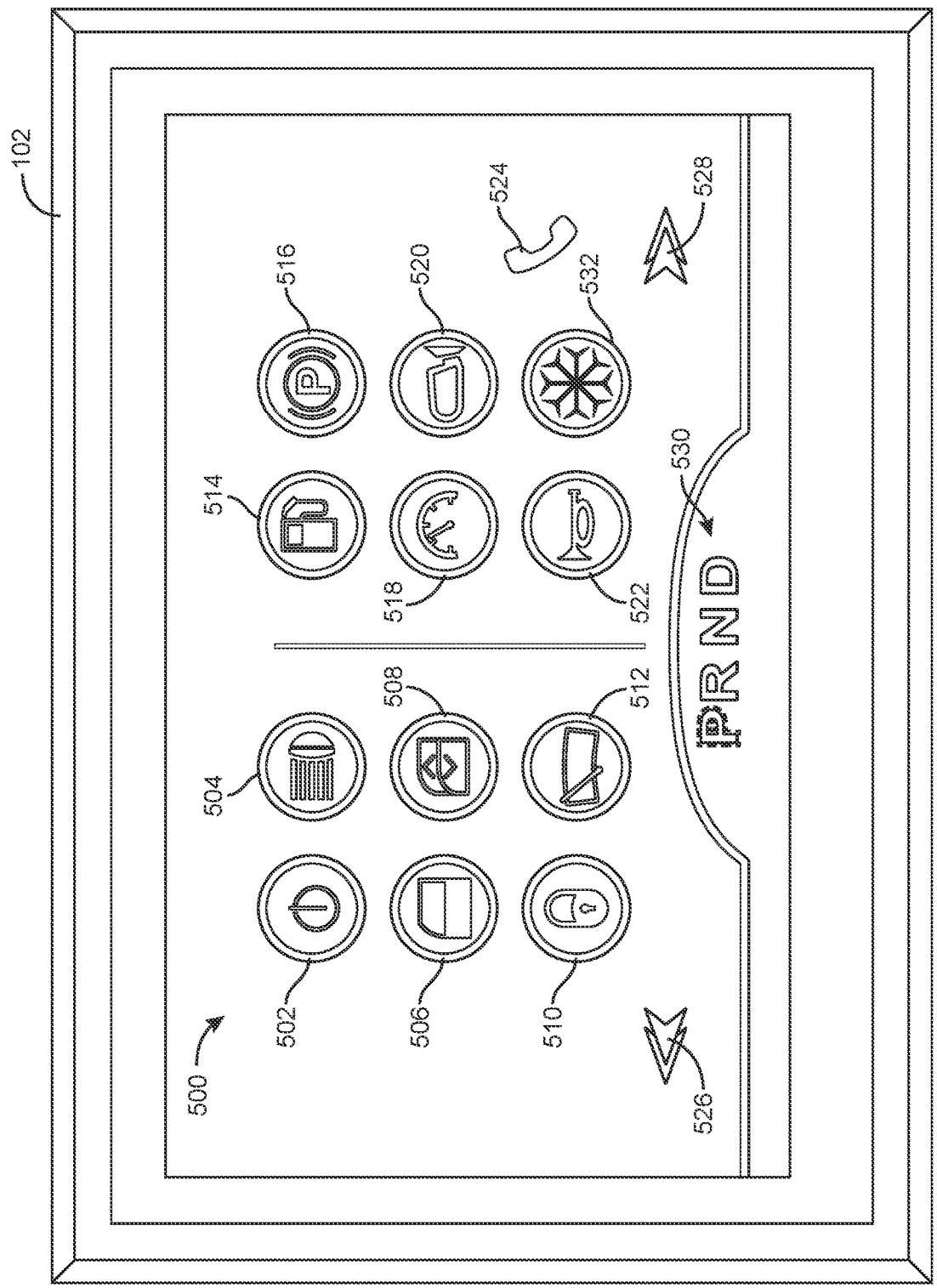
FIG. 5 is a diagram of a home screen graphical user interface (GUI) that can be displayed on a touch screen display of the control unit of FIG. 3, according to some embodiments.

Referring to FIG. 5, a home screen GUI 500 includes multiple buttons that can be pressed to navigate between different GUIs (e.g., by pressing a corresponding button on the touch screen 102 or the user device 179, or by using the handheld control unit 170), according to some embodiments. In some embodiments, the home screen GUI 500 includes a gear indicator 530 which indicates available gears and visually indicates which of the available gears are selected (e.g., by being highlighted, having a halo, having a different color, etc.). The home screen GUI 500 also includes a power button 502 that navigates to a power GUI 600 for starting the vehicle, a lighting button 504 that navigates to a lighting GUI 700 for changing lighting functions of the vehicle 10, a door button 506 that navigates to a door GUI 800, a window button 508 that navigates to a window GUI 900, a lock button 510, a wiper button 512 that navigates to a wiper GUI 1100, a fuel button 514 that navigates to a fuel GUI, a parking brake button 516, a cruise control button 518 that navigates to a cruise control GUI, a mirror button 520 that navigates to a window control GUI 1000, a horn button 522, a phone button 524 that navigates to a phone GUI or allows the user to make phone calls, an air conditioning button 532, and left and right arrow buttons 526 and 528 that can be pressed to view additional buttons that, when pressed, navigate to a corresponding GUI (e.g., a radio button that navigates to a radio/infotainment GUI, etc.), or transition between any of the GUIs shown in FIGS. 6-11.

Pressing the lock button 510 may cause door locks of the vehicle 10 to actuate between a locked position or an unlocked position. Pressing the horn button 522 (e.g., holding the horn button) may cause a horn of the vehicle 10 to be operated (e.g., as long as the horn button 522 is pressed by the user). Pressing the parking brake button 516 may activate or deactivate the parking brake (e.g., if the currently selected gear is a park gear). Pressing the fuel button 514 may activate a fuel door latch release. Similarly, pressing the cruise control button 518 may navigate to the cruise control GUI, and allows the user to adjust cruise control of the vehicle 10 such as increasing or decreasing a speed setpoint, activating or deactivating cruise control, pausing cruise control, cancelling cruise control, or setting a speed setpoint for the cruise control of the vehicle 10. Pressing the phone button 524 may navigate to the phone GUI where the user can perform or receive phone calls. Pressing the air conditioning button 532 may navigate to an air conditioning GUI where the use can change air conditioning settings (e.g., the temperature, fan speed, etc.).

The gear indicator 530 can include various icons (e.g., "P", "R", "N", and "D" icons) which may also function as buttons. The icons may be pressed to transition the transmission 24 of the vehicle 10 between different gears. In some embodiments, a left turn signal indicator button 526 and a right turn signal indicator button 528 can be pressed to activate a left turn indicator or right turn indicator, respectively. In some embodiments, the icons (e.g., the "P", "R", "N", and "D" icons) can be pressed to transition the transmission 24 of the vehicle 10 between different gears.

Figure 6:
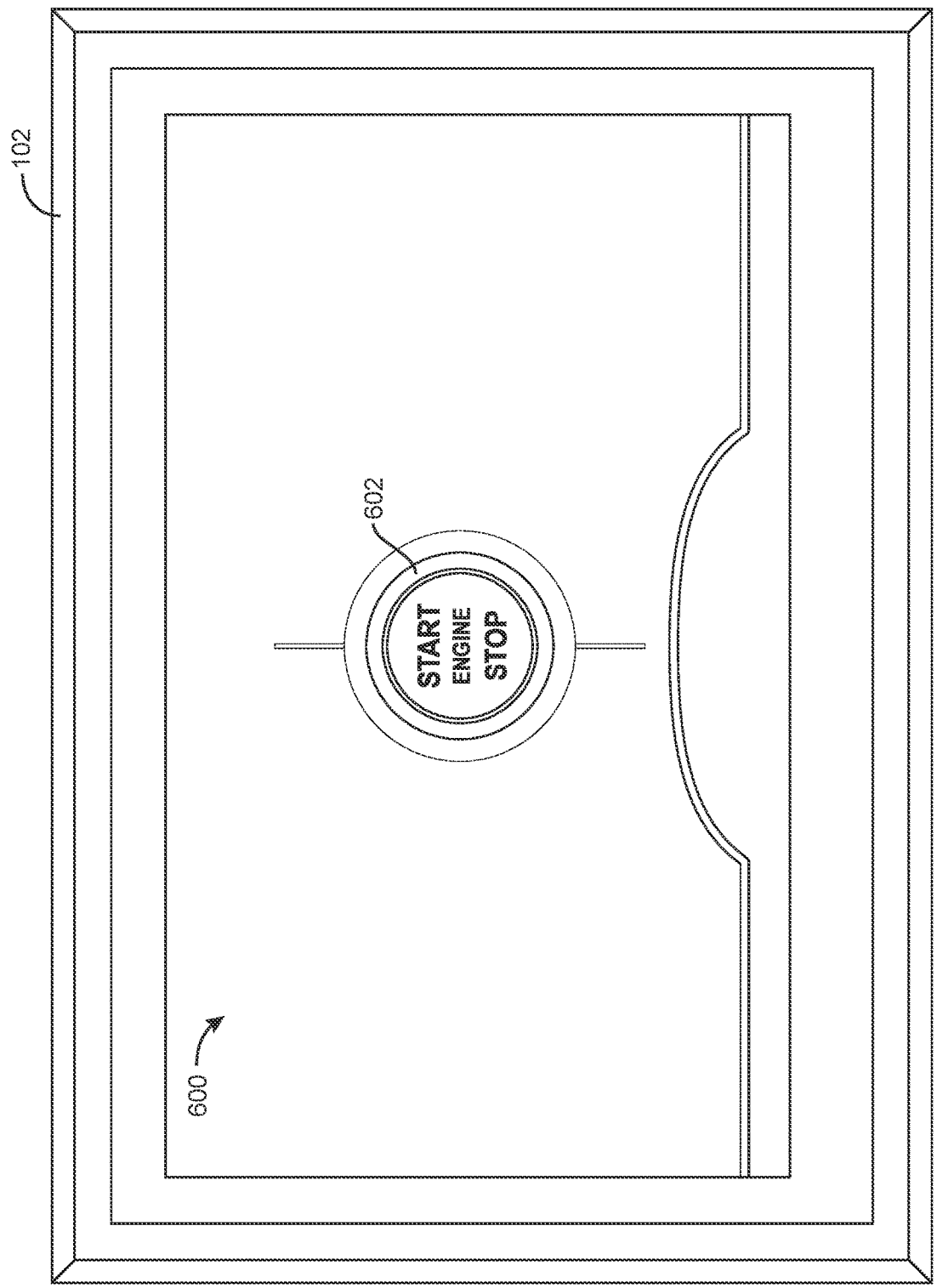
FIG. 6 is a diagram of an engine start/stop GUI that can be displayed on a touch screen display of the control unit of FIG. 3, according to some embodiments.

Referring to FIG. 6, the power GUI 600 includes a start/stop button 602, according to some embodiments. In some embodiments, the start/stop button 602 is an engine ignition button that can be pressed to start an engine of the vehicle 10 (e.g., the primary mover 18) or to shut off the engine of the vehicle 10. The start/stop button 602 can similarly be configured to actuate an electric motor of the vehicle 10 between an on state and an off state (e.g., if the vehicle 10 is an electric vehicle).

Figure 7:
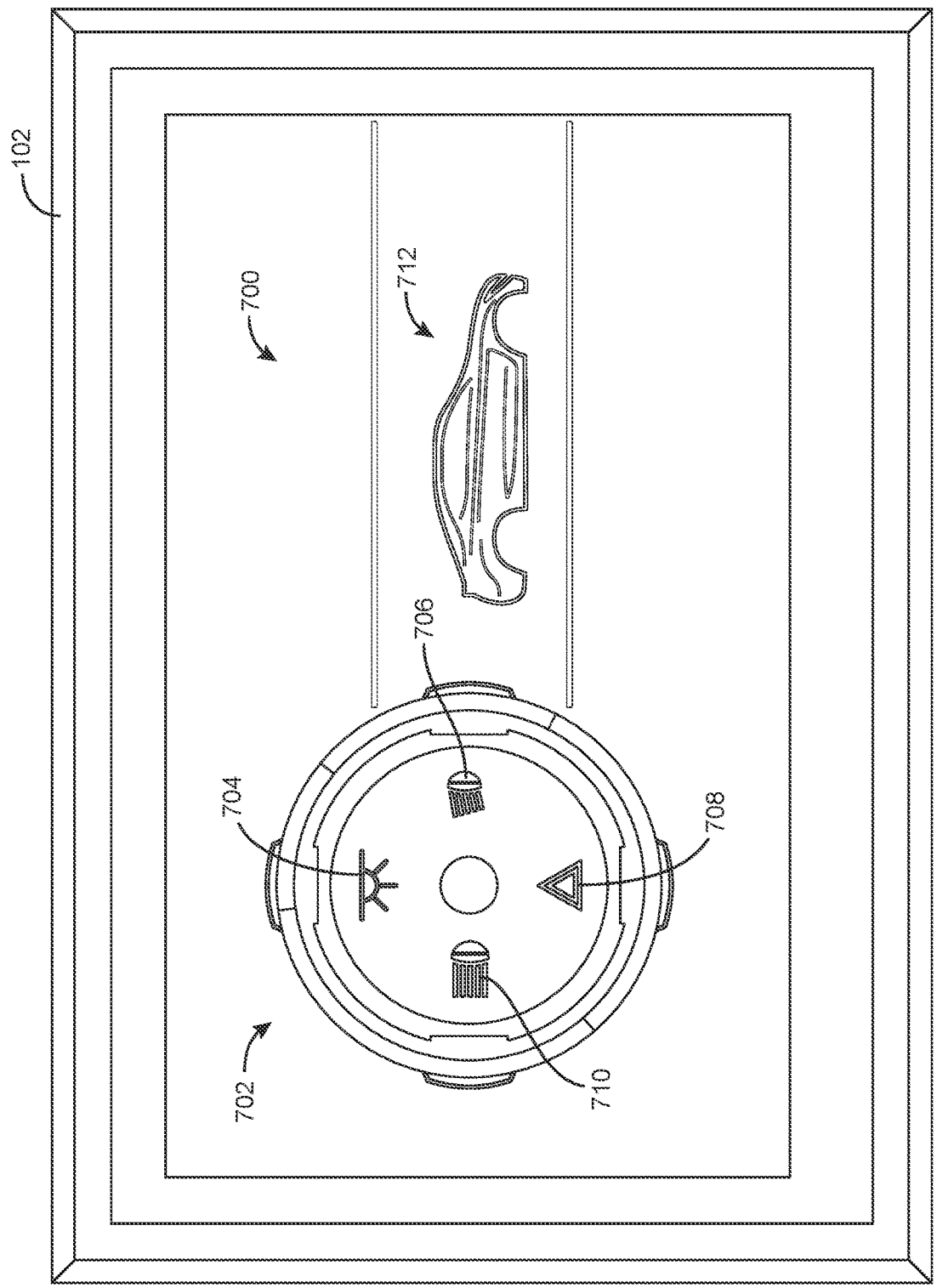
FIG. 7 is a diagram of a light control GUI that can be displayed on the touch screen display of the control unit of FIG. 3, according to some embodiments.

Referring to FIG. 7, the lighting GUI 700 includes a car icon 712, and a lighting icon 702. The car icon 712 may be updated to visually indicate which lights of the vehicle 10 are currently active. The lighting icon 702 includes a dome light icon 704, a high beam icon 710, a low beam icon 706, and a hazard flashers icon 708, according to some embodiments. In some embodiments, the high beam icon 710 can be pressed by the user to actuate high beam lights of the vehicle 10 between an on state and an off state. Similarly, the dome light icon 704, the low beam light icon 706, and/or the hazard flasher icon 708 can be pressed by the user to transition dome lights, low beams, and/or hazard flashers of the vehicle 10 between on states and off states. In some embodiments, pressing any of the buttons of the lighting icon 702 results in corresponding updates to the car icon 712 to thereby visually indicate to the operator of the vehicle 10 which lighting functions are currently active.

Figure 8:
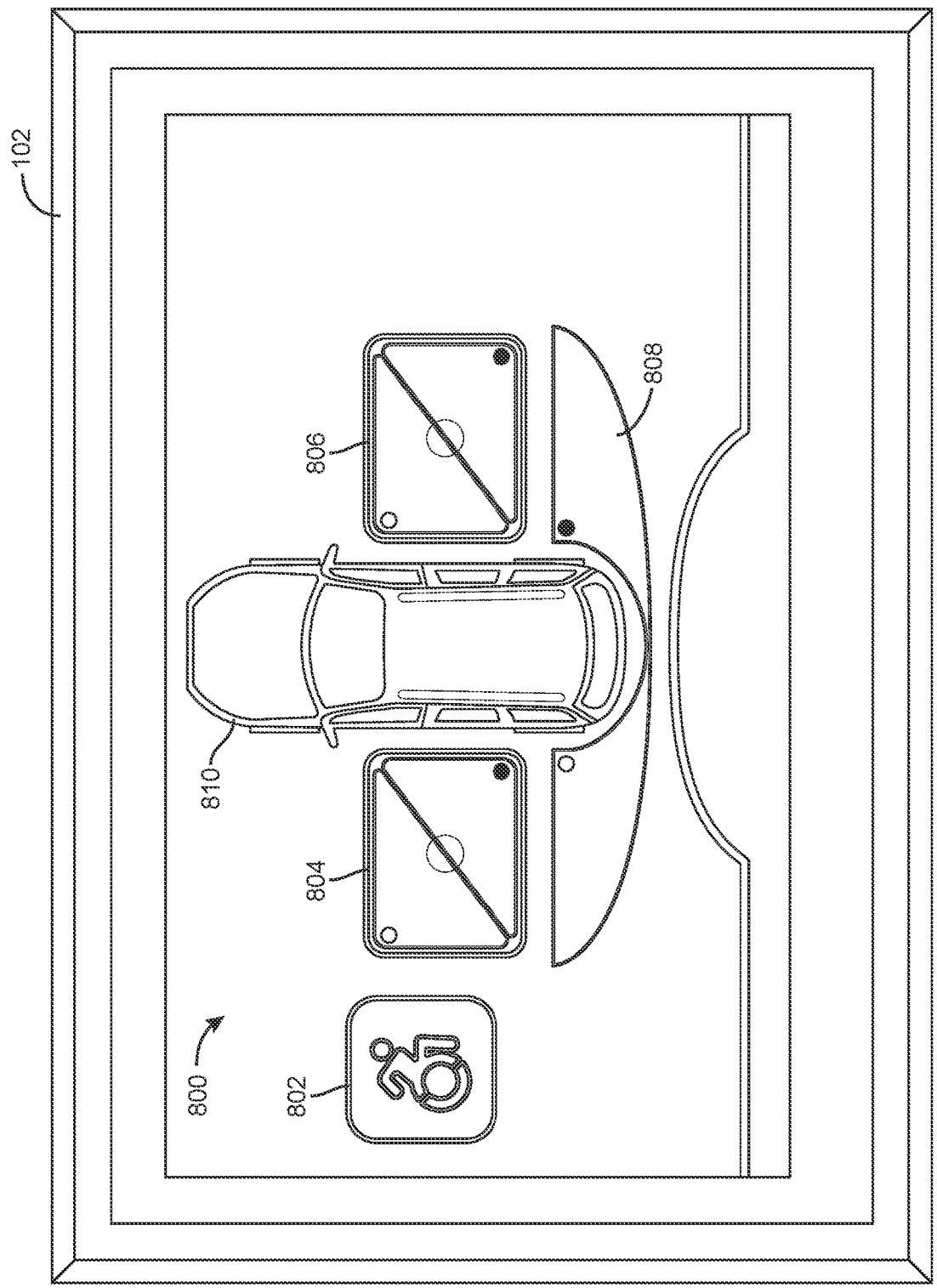
FIG. 8 is a diagram of a door control GUI that can be displayed on the touch screen display of the control unit of FIG. 3, according to some embodiments.

Referring to FIG. 8, the door GUI 800 includes a vehicle icon 810, a left door button 804, a right door button 806, and a wheelchair securement system release button 802, according to some embodiments. The vehicle icon 810 is configured to illustrate the vehicle 10 and provide reference so that the user or operator is informed regarding which side of the vehicle the buttons 804 or 806 operate. The wheelchair securement system release button 802 can operate a release mechanism of a wheelchair securement system. In some embodiments, the left door button 804 and the right door button 806 each include two portions. Pressing or pressing and holding an upper section of the buttons 804 and 806 can cause a corresponding door of the vehicle 10 (e.g., a left side or right side door, respectively) to operate to close, while pressing or pressing and holding a lower section of the buttons 804 and 806 causes the corresponding door of the vehicle 10 to operate to open (or vice versa). Similarly, a trunk button 808 can include two portions or two sections, and pressing a first section or portion may cause a trunk door of the vehicle 10 to open, while pressing a second section or portion may cause the trunk door of the vehicle 10 to close (or vice versa).

Figure 9:
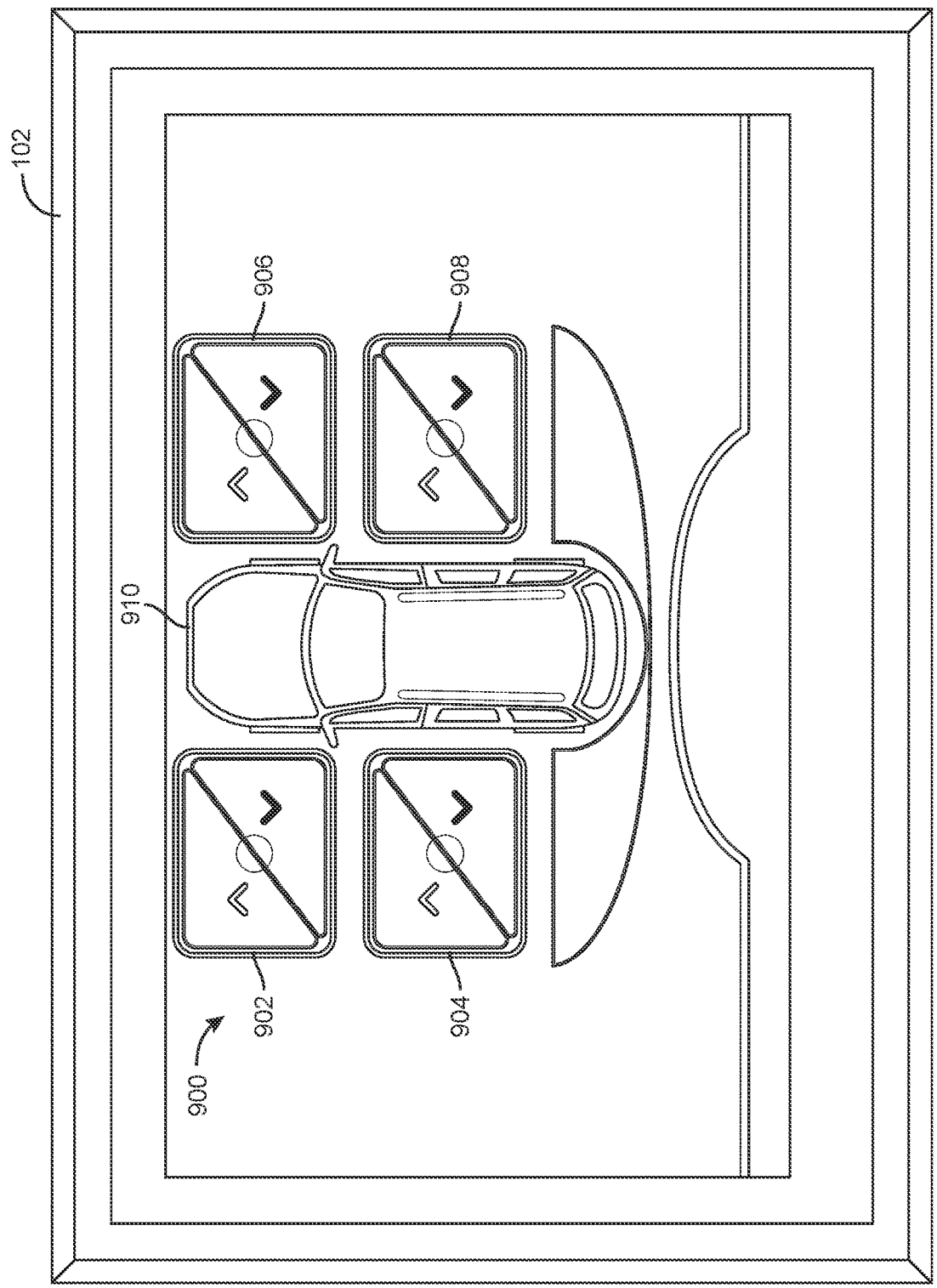
FIG. 9 is a diagram of a window control GUI that can be displayed on the touch screen display of the control unit of FIG. 3, according to some embodiments.

Referring to FIG. 9, the window GUI 900 includes a vehicle icon 910 (that represents the vehicle 10), and multiple window buttons 902-908, according to some embodiments. In some embodiments, each of the window buttons 902-908 can be pressed to operate a corresponding window (e.g., to raise or lower the window). The vehicle icon 910 can provide reference so that the user or operator knows which of the window buttons 902-908 is associated with which window.

Figure 10:
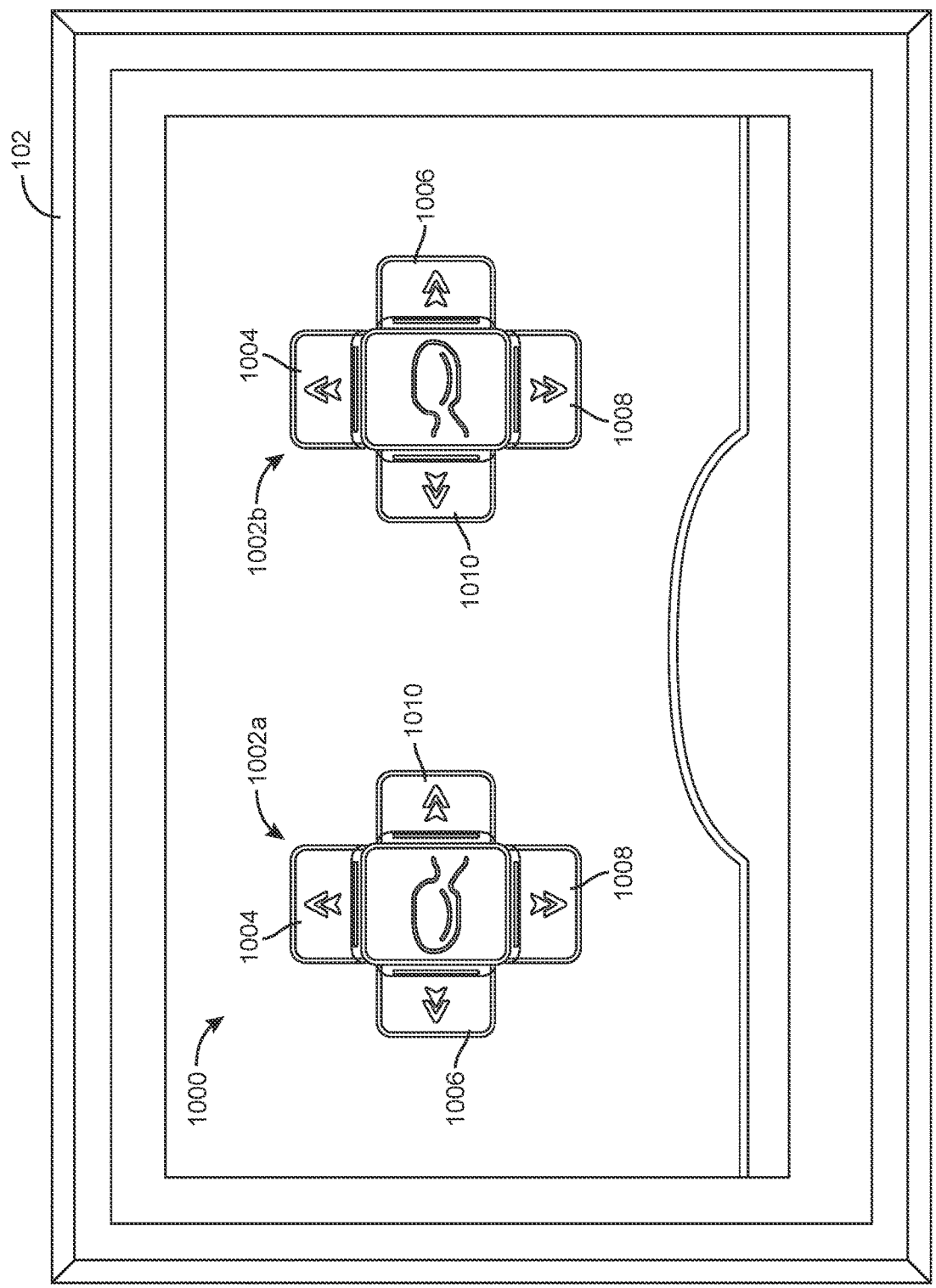
FIG. 10 is a diagram of a power mirror control GUI that can be displayed on the touch screen display of the control unit of FIG. 3, according to some embodiments.

Referring to FIG. 10, the mirror GUI 1000 includes a left mirror icon 1002a and a right mirror icon 1002b, according to some embodiments. In some embodiments, the left mirror icon 1002a and the right mirror icon 1002b each include an up button 1004, an outwards button 1006, a down button 1008, and an inwards button 1010. The up button 1004 of the left mirror icon 1002a or the right mirror icon 1002b can be pressed by the user so that the ECA 106 operates a left mirror or a right mirror to rotate or adjust upwards, the down button 1008 of the left mirror icon 1002a or the right mirror icon 1002b can be pressed so that the left mirror or the right mirror rotates or adjusts downwards, the inwards button 1010 of the left mirror icon 1002a or the right mirror icon 1002b can be pressed so that the left mirror or the right mirror rotate inwards, or the outwards button 1006 of the left mirror icon 1002a or the right mirror icon 1002b can be pressed so that the left mirror or the right mirror rotate outwards.

Figure 11:
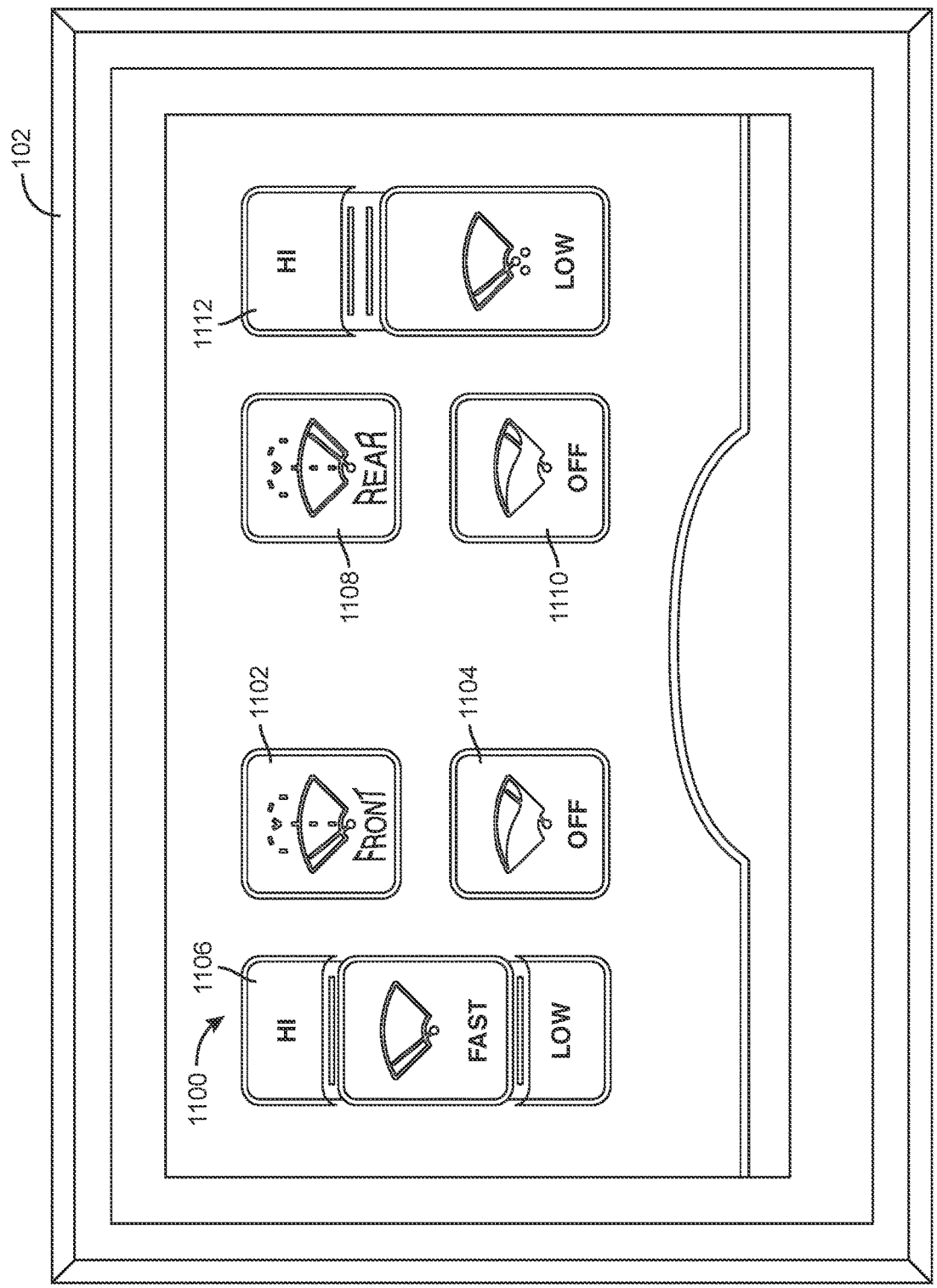
FIG. 11 is a diagram of a wiper control GUI that can be displayed on the touch screen display of the control unit of FIG. 3, according to some embodiments.

Referring to FIG. 11, the wiper GUI 1100 includes a front wiper button 1106, a front sprayer button 1102, a front off button 1104, a rear sprayer button 1108, a rear off button 1110, and a rear wiper button 1112, according to some embodiments. In some embodiments, the front wiper button 1106 includes an up button and a down button to increase or decrease an intermittent speed of windshield wipers of the vehicle 10. Pressing the "HI" button of the front wiper button 1106 may increase a speed of the wipers of the vehicle 10 (e.g., decrease an amount of time between subsequent wiping operations), while pressing the "LOW" button of the front wiper button 1106 may decrease the speed of the wipers of the vehicle 10 (e.g., increase the amount of time between subsequent wiping operations). The front wiper button 1106 may also include a "FAST" button or section, which when pressed by the user, causes the windshield wipers to be operated at a fast or specific speed. The front sprayer button 1102 can be pressed and held or released by the user or the operator to activate or deactivate a windshield washer system (e.g., to activate a pump that drives discharge of washing fluid onto the windshield and operating the windshield wipers). In some embodiments, the front off button 1104 can be pressed to shut off or stop operation of the windshield wipers. The rear sprayer button 1108 can be pressed and held or released by the user or the operator to activate or deactivate a rear window washer system (e.g., to activate the pump that drives discharge of the washing fluid onto the rear window and operating rear window wipers). In some embodiments, the rear off button 1110 can be pressed to turn off or deactivate operation of the rear window wipers. The rear wiper button 1112 can include an upper button (e.g., a "HI" button) and a lower button (e.g., a "LOW" button) which may be pressed by the user to transition rear wipers of the vehicle between a high speed and a low speed.

Touch Screen Mounting

Figure 14:
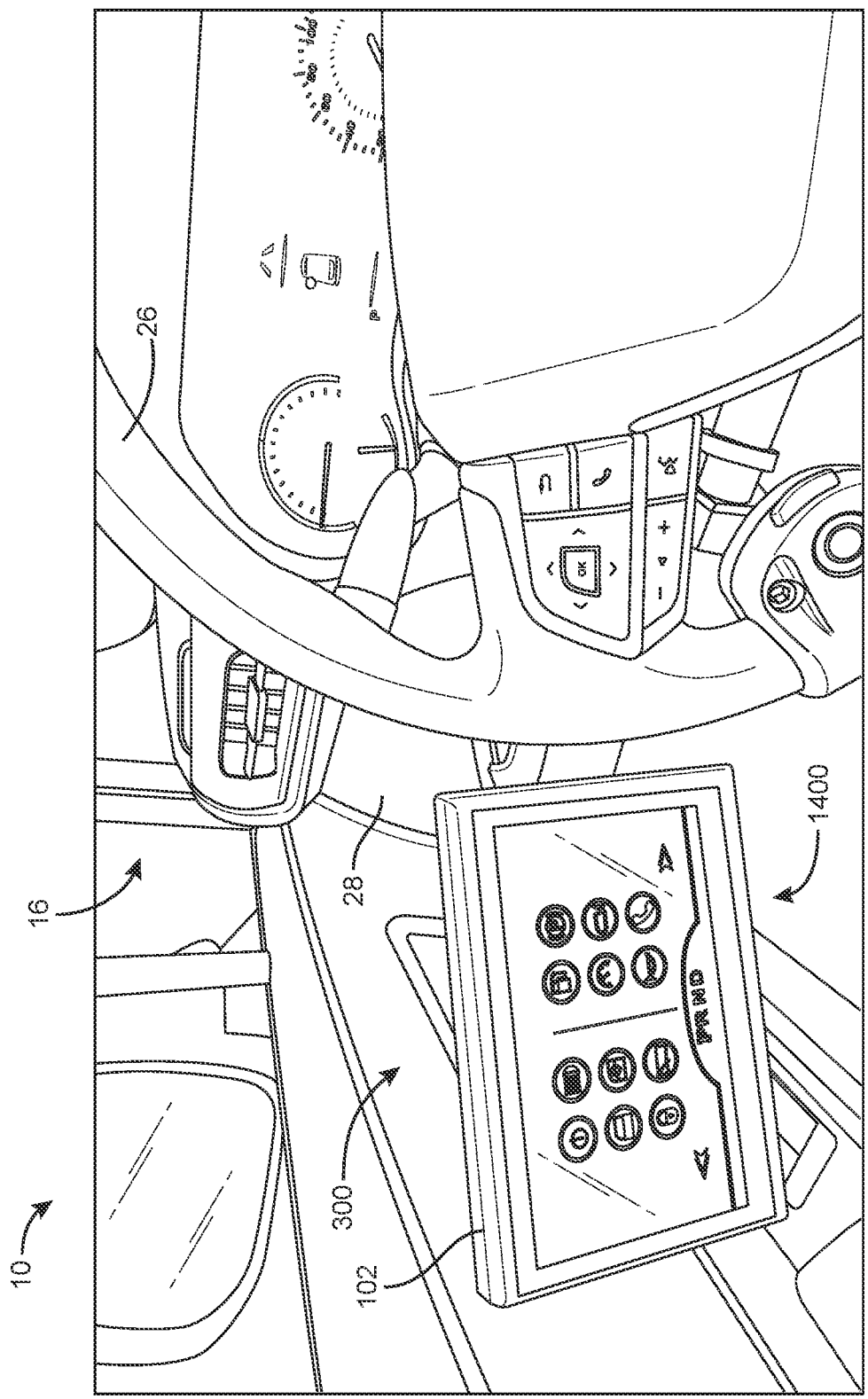
FIG. 14 is a perspective view of an interior of the vehicle of FIG. 1 including the control unit of FIG. 3 installed proximate a steering wheel of the vehicle, according to some embodiments.
Figure 15:
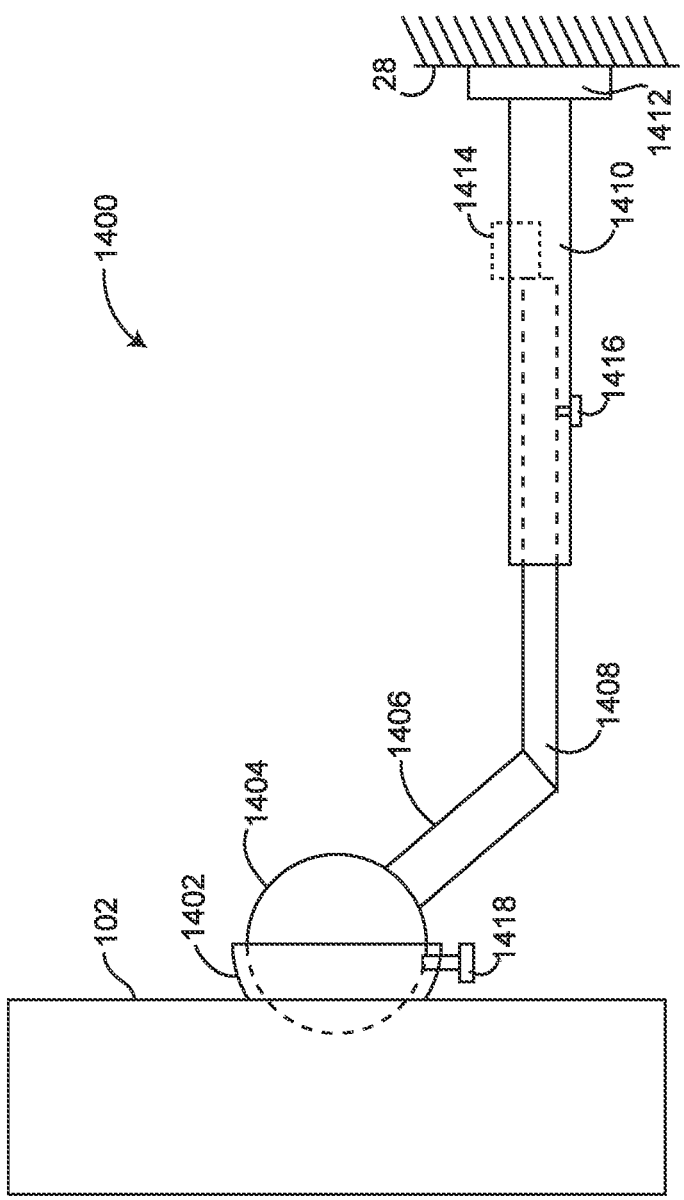
FIG. 15 is a diagram of a mounting system for the touch screen display of the control unit of FIG. 3, according to some embodiments.

Referring to FIGS. 14-15, the touch screen 102 can be mounted within the inner volume 16 of the vehicle 10 via a mounting system 1400 (e.g., an apparatus). The touch screen 102 may be positioned directly to a left or a right of a steering wheel 26 of the vehicle 10. The mounting system 1400 may extend between the touch screen 102 and a dashboard 28 of the vehicle 10 (or a structural portion of the vehicle 10). The mounting system 1400 may be configured to extend or retract and rotate the touch screen 102 relative to the dashboard 28 so that the touch screen 102 is within reach of the user. The touch screen 102 may be curved about either direction of the touch screen such as about a horizontal axis of the touch screen 102 or about a vertical axis of the touch screen 102.

Referring particularly to FIG. 15, the mounting system 1400 can include an outer tubular member 1410, an inner elongated member 1408, an elongated member 1406, a ball member 1404, and a receiver 1402, according to some embodiments. In some embodiments, the mounting system 1400 also includes a mounting member 1412 (e.g., a clamp, a plate with openings for fasteners, etc.) configured to secure, fasten, attach, or otherwise fixedly couple the outer tubular member 1410 with the dashboard 28 of the vehicle 10. The outer tubular member 1410 is configured to receive the inner elongated member 1408 to form a telescoping assembly, according to some embodiments. In some embodiments, the outer tubular member 1410 is slidably coupled with the inner elongated member 1408 so that the inner elongated member 1408 can be extended and retracted relative to the outer tubular member 1410. The outer tubular member 1410 and the inner elongated member 1408 may be manually extended or retracted, or the inner elongated member 1408 can be driven to translate relative to the outer tubular member 1410 by electric motor 1414. In some embodiments, the outer tubular member 1410 includes an opening or a threaded bore through which a set screw 1416 extends. The set screw 1416 can be tightened so that the set screw 1416 engages the inner elongated member 1408 to limit relative translation of the inner elongated member 1408 and the outer tubular member 1410. In some embodiments, the elongated member 1406 and the inner elongated member 1408 are fixedly coupled with each other, or hingedly coupled with each other. In some embodiments, the elongated member 1406 and the inner elongated member 1408 are coupled with each other through a ball and socket joint.

The elongated member 1406 is fixedly coupled or integrally formed with the ball member 1404, according to some embodiments. The ball member 1404 is received within the receiver 1402 (e.g., a socket) that is fixedly coupled or integrally formed with the touch screen 102, according to some embodiments. In some embodiments, the receiver 1402 is configured to receive or threadingly couple with a set screw 1418 that can be turned in either direction to allow relative rotation between the receiver 1402 and the ball member 1404 or limit relative rotation between the receiver 1402 and the ball member 1404. In some embodiments, the ball member 1404 and the receiver 1402 are configured to form a ball and socket joint which facilitates adjustment of the touch screen 102 (e.g., rotation) in any direction. Advantageously, the mounting system 1400 facilitates positioning the touch screen 102 within reach of a user or operator of the vehicle 10 that has a physical disability to thereby allow operation of various features of the vehicle 10 that the user would otherwise be unable to control (e.g., due to decreased fine motor skills).

Figure 16:
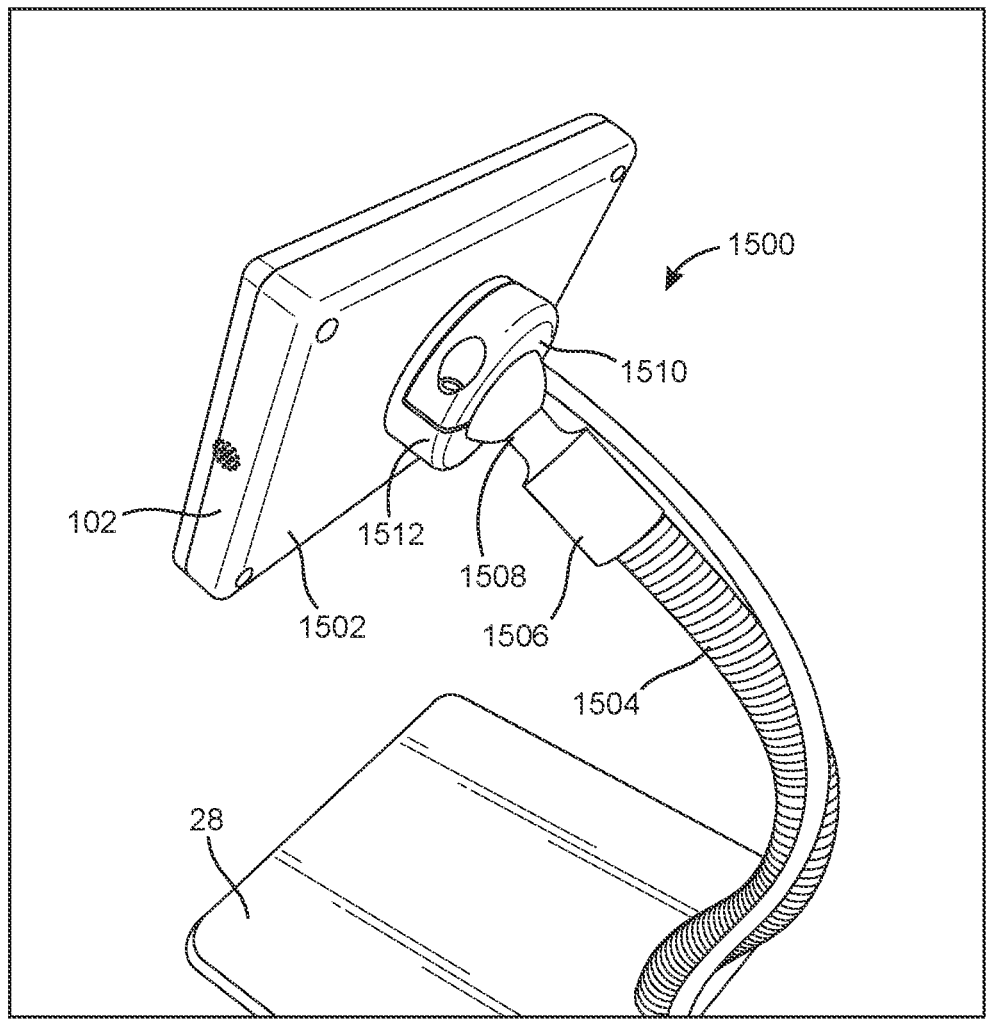
FIG. 16 is a diagram of another mounting system for the touch screen display of the control unit of FIG. 3, according to some embodiments.
Figure 17:
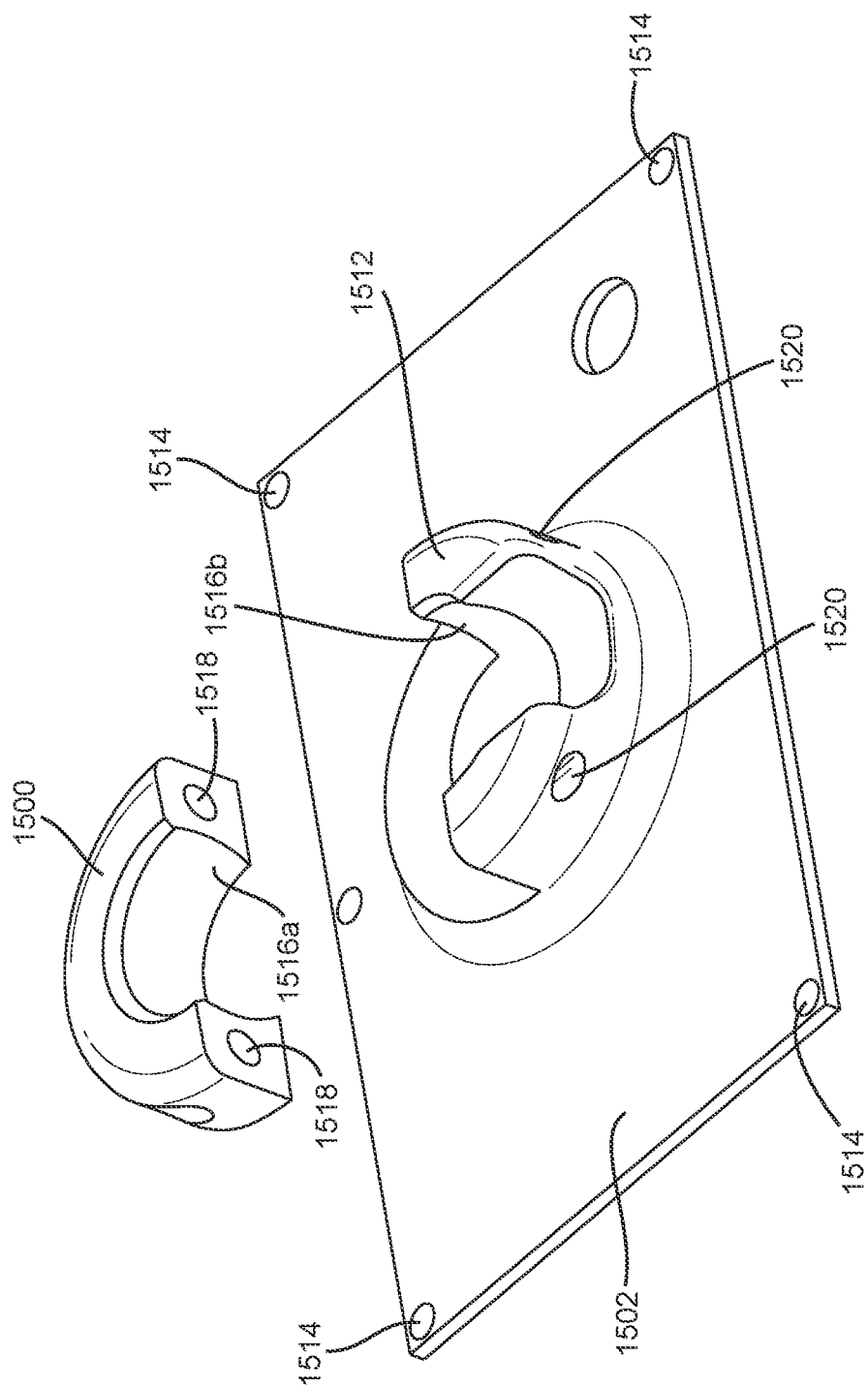
FIG. 17 is an exploded perspective view of a portion of the mounting system of FIG. 16, according to some embodiments.

Referring to FIGS. 16 and 17, another mounting system 1500 that can be used to mount the touch screen 102 on the dashboard 28 is shown, according to some embodiments. The mounting system 1500 includes a bendable member 1504 that fixedly couples with the dashboard 28 and supports the touch screen 102. The bendable member 1504 may be adjustable by hand and may maintain a current state or position once the touch screen 102 is adjusted to a desired position. In some embodiments, the bendable member 1504 is formed by multiple linkages that are arranged in series and provide sufficient frictional interfaces between each other to maintain a current shape of the bendable member 1504. In some embodiments, the bendable member 1504 is or includes a malleable material that has sufficient structural strength to be bent in multiple directions and maintain its shape when the touch screen 102 is adjusted to the desired position.

The bendable member 1504 includes an end member 1506 that forms a ball 1608. The ball 1608 is received between a first annular member 1510 and a second annular member 1512 that provide a clamping force to the ball 1608. The first annular member 1510 may be fastened or removably coupled with the second annular member 1512. The second annular member 1512 is integrally formed with a plate 1502 that is coupled with (e.g., via fasteners extending through holes, bores, openings, etc., shown as apertures 1514) the touch screen 102 to thereby couple the touch screen 102 on the end of the bendable member 1504. In some embodiments, the first annular member 1510 and the second annular member define surfaces 1516a and 1516b that cooperatively define a spherical surface that corresponds to the shape of the ball 1508. The first annular member 1510 includes openings 1518 (e.g., threaded holes, smooth bores, etc.), according to some embodiments. The second annular member 1512 includes openings (e.g., threaded holes, smooth bores, etc.), according to some embodiments. In some embodiments fasteners extend through the openings 1518 and the openings 1520 to couple the first annular member 1510 with the second annular member 1512 with the ball 1508 positioned between the first annular member 1510 and the second annular member 1512. The annular members 1510 and 1512 may form a socket within which the ball 1508 is received. In some embodiments, the fasteners that couple the first annular member 1510 with the second annular member 1512 are adjustable so that the touch screen 102 may be adjusted to a desired orientation. The fasteners that couple the first annular member 1510 with the second annular member 1512 may be adjusted (e.g., tightened) to clamp the ball 1508 in the socket formed by the first annular member 1510 and the second annular member 1512 so that the touch screen 102 is locked at the desired orientation.

Process

Figure 4:
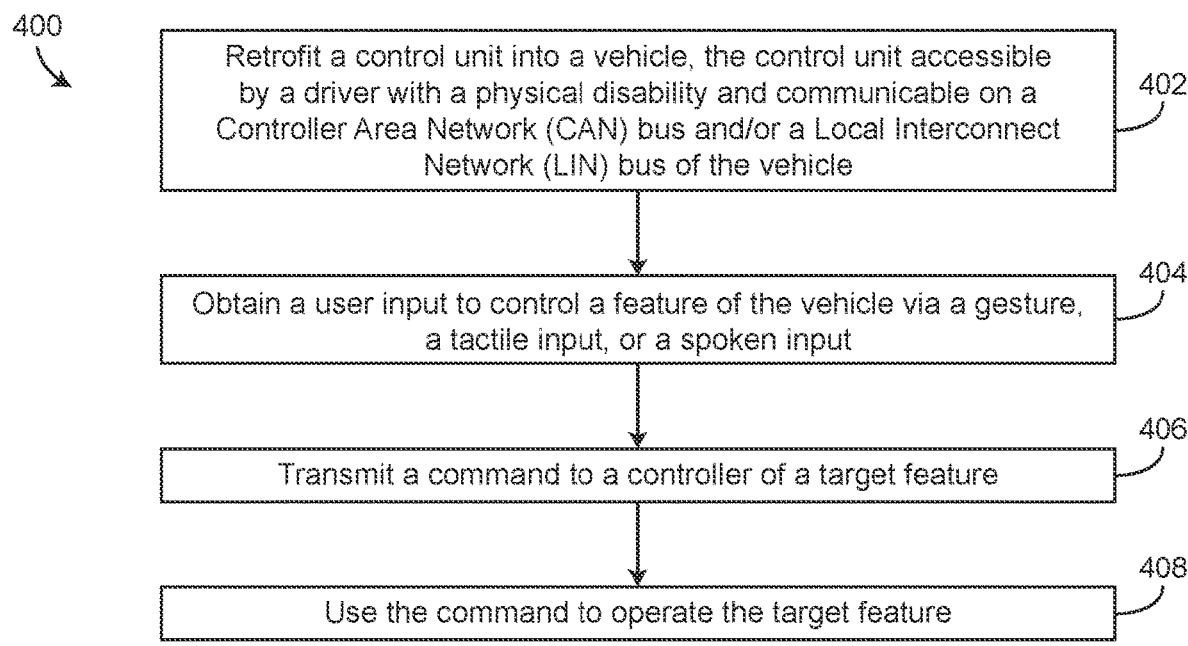
FIG. 4 is a flow diagram of a process for controlling one or more features of a vehicle, according to some embodiments.

Referring to FIG. 4, a process 400 for controlling a vehicle for physically disabled users is shown, according to some embodiments. The process 400 includes steps 402-408 and can be performed by the control system 100 once the control system 100 is configured and installed on a vehicle. The process 400 facilitates changing a modality of user inputs for various features of a vehicle to thereby allow or enable a physically disabled operator to control features. In particular, the, process 400 may facilitate user input for a user with decreased fine motor skills. For example, certain features of a vehicle may be designed by the vehicle manufacturer to require fine motors skills (e.g., using fingers to press switches, grasping certain shapes of input devices, etc.) which can be difficult for a physically disabled user to operate. Advantageously, the control system 100 and the process 400 as described herein facilitate allowing a physically disabled user or a user with decreased fine motor skills to control various features of the vehicle 10 which the user could not otherwise operate, or which would be difficult for the user to operate.

The process 400 includes retrofitting a control unit into a vehicle, the control unit accessible by a driver with a physical disability and communicable on a Controller Area Network (CAN) bus and/or a Local Interconnect Network (LIN) bus of the vehicle (step 402), according to some embodiments. In some embodiments, step 402 is performed by a technician by installing various components of the control system 100 as described in greater detail above with reference to FIGS. 2A-2B, 12-13, and 14-15. For example, step 402 can include installing the touch screen 102 within the vehicle 10 with the mounting system 1400, communicably connecting the ECA 106 on the CAN bus 200, communicably connecting various of the peripheral devices shown in FIG. 2A on the CAN bus 200 (e.g., the VLNIC 138, the VCNIC 140 or the CAN FD microcontroller 128 functionality implemented on the VCNIC 140, etc.), installing the components of the gear control system 136, etc. In some embodiments, performing step 402 configures the control unit to control, activate, or deactivate various features which would otherwise be operated by local switches positioned about a cabin of the vehicle.

The process 400 also includes obtaining a user input to control a feature of the vehicle via a gesture, a tactile input, or a spoken input (step 404), according to some embodiments. The tactile inputs can be obtained as button presses or touching a screen at any of the touch screen 102, the user device 178, the handheld control unit 170, etc. The gestures can be hand gestures, facial gestures, etc., and can be identified by the control unit (e.g., the ECA 106 or processing circuitry 120 thereof) via image data obtained by a camera or imaging device (e.g., camera 118), using one or more recognition techniques (e.g., facial recognition techniques, gesture detection, etc.). The spoken input can be obtained at a microphone (e.g., microphone 114) of the control unit (e.g., the ECA 106), at a home device (e.g., home device 176), or at a user's smartphone that is equipped with a mobile application (e.g., the user device 178). In some embodiments, step 404 is performed by the ECA 106, which may obtain the user inputs (e.g., requests to perform an associated function of the vehicle) from a variety of sources.

The process 400 also includes transmitting a command to a controller of a target feature (step 406), according to some embodiments. In some embodiments, step 406 is performed by the ECA 106, the CAN FD microcontroller 128, the VCNIC 140, and/or the VLNIC 138 to transmit the command along a CAN bus of the vehicle, or a LIN bus of the vehicle (e.g., the CAN bus 200, the LIN bus 142, etc.). In some embodiments, step 406 includes interrupting, suppressing, modifying, and/or reproducing communications on the CAN bus or the LIN bus of the vehicle. The command can be provided to a controller of the target feature, or to an electric motor of the target feature. The command may be a command to adjust operation of, activate, or deactivate the target feature. In some embodiments, the target feature is any of lighting, indicators, horn, power windows, wipers, AC or heating, parking brake, power mirrors, power doors, cruise control, door lock, radio or infotainment, engine or electric motor ignition, a gear control system, etc.

The process 400 includes using the command to operate the target feature (step 408), according to some embodiments. In some embodiments, the command is used by the target feature (e.g., by a controller, a microcontroller, a logic controller, an electric motor, etc.) to operate the target feature (e.g., to adjust operation of the target feature, to activate the target feature, to deactivate the target feature, etc.). In some embodiments, step 408 is performed by a peripheral device or a controller or module of the target feature that is communicable on the CAN bus of the vehicle, the LIN bus of the vehicle, or any other communications system of the vehicle.

Configuration of Exemplary Embodiments

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claim.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A retrofit control system for a vehicle comprising:
a touch screen retrofit on the vehicle and configured to receive a user input, the touch screen physically mounted directly on either side of a steering wheel of the vehicle;
a function-specific programmable logic controller (PLC) configured to communicate with a CAN bus of the vehicle;
an embedded computer assembly (ECA) retrofit on the vehicle and comprising processing circuitry configured to:
suppress communications on the CAN bus of the vehicle from an input device installed or designed by a manufacturer of the vehicle, the input device configured to obtain a first user input via a first modality of user input;
obtain a second user input from the touch screen, the second user input provided via a second modality of user input; and
provide a control signal to the PLC and the CAN bus of the vehicle to perform a requested vehicle function according to the second user input by generating new communications on the CAN bus of the vehicle;
wherein suppressing the communications on the CAN bus from the input device of the vehicle and generating the new communications on the CAN bus according to the second user input from the touch screen changes a modality of user input used to control the requested vehicle function from the first modality of user input to the second modality of user input.

2. The retrofit control system of claim 1, wherein the touch screen is mounted on either side of the steering wheel to be accessible by an operator of the vehicle with a physical disability, the touch screen comprising a horizontal or vertical curvature to facilitate accessibility by the operator.

3. The retrofit control system of claim 1, wherein the retrofit control system is a retrofit system configured to provide touch screen control for one or more vehicle functions of the vehicle that are not controlled by a touch screen.

4. The retrofit control system of claim 1, wherein the ECA is configured to control at least lighting, turn indicators, a horn, rolling operations of windows, wiper operations, air conditioning operations, parking brake activation, gear shifting, power doors, power mirrors, door locks, cruise control, and radio or infotainment of the vehicle responsive to user inputs received at the touch screen.

5. The retrofit control system of claim 1, further comprising a microphone configured to obtain the user input as a voice command, and a camera configured to obtain the user input as a detected gesture.

6. The retrofit control system of claim 1, further comprising a speaker configured to provide audio feedback to an operator as the operator interacts with the retrofit control system.

7. The retrofit control system of claim 1, further comprising a linear actuator operably coupled with a transmission cable of the vehicle, wherein the ECA is configured to cause the linear actuator to operate to transition between different gears of the vehicle in response to a user input to transition into a different gear, the touch screen configured to display a currently selected gear of the vehicle.

8. The retrofit control system of claim 1, wherein the ECA is further configured to wirelessly communicate with a personal computer device, wherein the personal computer device is configured to receive the user input from an operator and wirelessly transmit the user input to the processing circuitry of the ECA.

9. The retrofit control system of claim 1, further comprising a vehicle Local Interconnect Network (LIN) controller, the vehicle LIN controller configured to intersect serial communications of a LIN bus of the vehicle to perform the requested vehicle function.

10. A vehicle comprising:
a controller area network (CAN) bus;
a local interconnect network (LIN) bus; and
a control system for controlling a plurality of functions of the vehicle, the control system comprising:
a touch screen configured to receive a user input, the touch screen physically mounted directly on one side of a steering wheel of the vehicle;
a CAN microcontroller configured to communicate with the CAN bus of the vehicle;
a LIN controller configured to communicate with the LIN bus of the vehicle; and
an embedded computer assembly (ECA) comprising processing circuitry configured to:
obtain the user input from the touch screen; and
provide a control signal to the CAN bus and the LIN bus via the CAN microcontroller and the LIN controller to perform a requested vehicle function according to the user input by suppressing communications on the CAN bus and the LIN bus associated with an input device installed or designed by a manufacturer of the vehicle and generating new communications on the CAN bus and the LIN bus;
wherein the touch screen and the ECA are retrofit on the vehicle and the ECA is configured to suppress the communications on the CAN bus and the LIN bus from the input device and generate the new communications on the CAN bus and the LIN bus such that the control system provides control, via the touch screen, of one or more vehicle functions that are not controllable via touch screen by the input device.

11. The vehicle of claim 10, wherein the touch screen is mounted on the one side of the steering wheel to be accessible by an operator of the vehicle with a physical disability, the touch screen comprising a horizontal or vertical curvature to facilitate accessibility by the operator or being straight.

12. The vehicle of claim 10, wherein the control system is a retrofit system configured to provide touch screen control for one or more vehicle functions of the vehicle that are not controlled by a touch screen.

13. The vehicle of claim 10, wherein the ECA is configured to control at least lighting, turn indicators, a horn, rolling operations of windows, wiper operations, air conditioning operations, parking brake activation, gear shifting, power doors, power mirrors, door locks, cruise control, and radio or infotainment of the vehicle responsive to user inputs received at the touch screen.

14. The vehicle of claim 10, wherein the ECA further comprises a microphone configured to obtain the user input as a voice command, and a camera configured to obtain the user input as a detected gesture.

15. The vehicle of claim 10, wherein the ECA further comprises a speaker configured to provide audio feedback to an operator as the operator interacts with the control system.

16. The vehicle of claim 10, wherein the control system further comprises a linear actuator operably coupled with a transmission cable of the vehicle, wherein the ECA is configured to cause the linear actuator to operate to transition between different gears of the vehicle in response to a user input to transition into a different gear, the touch screen configured to display a currently selected gear of the vehicle.

17. The vehicle of claim 10, wherein the ECA is further configured to wirelessly communicate with a personal computer device, wherein the personal computer device is configured to receive the user input from an operator and wirelessly transmit the user input to the processing circuitry of the ECA.

18. A method for controlling operation of one or more features of a vehicle, the method comprising:
- retrofitting a vehicle with a control unit comprising a touch screen display and an embedded computer assembly (ECA), the ECA configured to control communications on a controller area network (CAN) bus of the vehicle;
- suppressing communications on the CAN bus of the vehicle from an input device installed or designed by a manufacturer of the vehicle, the input device configured to obtain a first user input via a first modality of user input;
- obtaining, at the touch screen display, a second user input to control a requested function of the vehicle, the second user input provided via a second modality of user input, the touch screen display positioned on a mount next to a steering wheel of the vehicle and accessible to an operator of the vehicle with impaired fine motor skills; and
- providing a control signal to a controllable element of the vehicle via the CAN bus to perform the requested function of the vehicle according to the second user input by generating new communications on the CAN bus of the vehicle.

19. The method of claim 18, wherein the ECA is configured to suppress and generate new communications on the CAN bus of the vehicle to control at least lighting, turn indicators, a horn, rolling operations of windows, wiper operations, air conditioning operations, parking brake activation, gear shifting, power doors, power mirrors, door locks, cruise control, and radio or infotainment of the vehicle responsive to user inputs received at the touch screen.

20. The method of claim 19, further comprising:
- receiving, via a microphone or a camera of the control unit, another user input to control the function of the vehicle, the user input comprising a spoken command or a gesture; and
- controlling, by the ECA and communications on the CAN bus of the vehicle, the controllable element of the vehicle to perform the function of the vehicle requested by the spoken command or the gesture;
- wherein the function of the vehicle comprises any of the lighting, the turn indicators, the horn, the rolling operations of windows, the wiper operations, the air conditioning operations, the parking brake activation, the gear shifting, the power doors, the power mirrors, the door locks, the cruise control, or the radio or infotainment operations of the vehicle responsive to user inputs received at the touch screen.

21. The retrofit control system of claim 1, wherein the processing circuitry is further configured to, in response to actuation of a digital accessibility button of the retrofit control system:
- sequentially present a list of control commands;
- obtain a selection of one of the control commands from the list of control commands as a third user input in response to actuation of the digital accessibility button; and
- provide a control signal to the PLC and the CAN bus of the vehicle to perform a requested vehicle function associated with the selection of the one of the control commands from the list of control commands in response to actuation of the digital accessibility button.

* * * * *